United States Patent
Khoshnevisan et al.

(10) Patent No.: US 11,956,717 B2
(45) Date of Patent: Apr. 9, 2024

(54) TECHNIQUES FOR SELECTING AN UPLINK CONTROL INFORMATION REPORTING MODE

(71) Applicant: QUALCOMM Incorporated, San Diego, CA (US)

(72) Inventors: Mostafa Khoshnevisan, San Diego, CA (US); Tao Luo, San Diego, CA (US); Xiaoxia Zhang, San Diego, CA (US); Jing Sun, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 544 days.

(21) Appl. No.: 17/088,946

(22) Filed: Nov. 4, 2020

(65) Prior Publication Data

US 2021/0227458 A1    Jul. 22, 2021

Related U.S. Application Data

(60) Provisional application No. 62/961,899, filed on Jan. 16, 2020.

(51) Int. Cl.
*H04L 5/00* (2006.01)
*H04W 48/20* (2009.01)
(Continued)

(52) U.S. Cl.
CPC ............. *H04W 48/20* (2013.01); *H04L 5/001* (2013.01); *H04W 72/21* (2023.01); *H04W 72/23* (2023.01)

(58) Field of Classification Search
CPC ..... H04W 48/20; H04W 72/21; H04W 72/23; H04W 48/16; H04W 72/02; H04L 5/001; H04L 5/0055; H04L 5/0053
See application file for complete search history.

(56) References Cited

U.S. PATENT DOCUMENTS 9,277,471 B2 *   3/2016   He ........................ H04W 4/70
9,559,812 B2 *   1/2017   Hwang ................ H04L 1/1861
(Continued)

FOREIGN PATENT DOCUMENTS

| EP | 2562949 A2 | 2/2013 |
| WO | WO-2017171299 A1 | 10/2017 |
| WO | WO-2018175820 A1 | 9/2018 |

OTHER PUBLICATIONS

International Search Report and Written Opinion—PCT/US2020/065903—ISA/EPO—dated Apr. 20, 2021.

*Primary Examiner* — Hoang-Chuong Q Vu
(74) *Attorney, Agent, or Firm* — Dalei Dong; Holland & Hart LLP

(57) ABSTRACT

Techniques for wireless communications are described. A mode for reporting uplink control information may be selected when a first serving cell and a second serving cell are both configured with uplink control resources. The reporting modes may include a mode for transmitting uplink control information over one uplink control resource or over multiple uplink control resources. Multiple sets of uplink control information may be separately generated for different sets of component carriers or different transmission/reception points. After selecting the reporting mode, the multiple sets of uplink control information may be transmitted over one or multiple uplink control resources in accordance with the selected reporting mode. Communication devices may switch between the reporting modes based on obtained information or calculations.

57 Claims, 12 Drawing Sheets

(51) Int. Cl.
*H04W 72/04* (2023.01)
*H04W 72/21* (2023.01)
*H04W 72/23* (2023.01)

(56) References Cited

U.S. PATENT DOCUMENTS

| | | | |
|---|---|---|---|
| 2013/0028205 A1 | 1/2013 | Damnjanovic et al. | |
| 2015/0201429 A1* | 7/2015 | Chen | H04W 72/54 |
| | | | 370/329 |
| 2015/0245232 A1* | 8/2015 | Luo | H04W 24/08 |
| | | | 370/252 |
| 2016/0149628 A1* | 5/2016 | Davydov | H04L 5/001 |
| | | | 370/329 |
| 2017/0142695 A1* | 5/2017 | Chen | H04W 72/21 |
| 2017/0273037 A1* | 9/2017 | Uchino | H04W 24/10 |
| 2017/0280430 A1* | 9/2017 | Yin | H04W 72/23 |
| 2017/0325216 A1* | 11/2017 | Nogami | H04L 5/0055 |
| 2018/0092085 A1* | 3/2018 | Shaheen | H04W 36/14 |
| 2019/0116489 A1* | 4/2019 | Harada | H04W 72/23 |
| 2019/0364468 A1 | 11/2019 | Yerramalli et al. | |
| 2020/0322199 A1* | 10/2020 | Matsumura | H04L 5/0007 |
| 2020/0359441 A1* | 11/2020 | Yilmaz | H04W 76/18 |
| 2020/0374045 A1* | 11/2020 | Yin | H04L 1/1854 |
| 2022/0217746 A1* | 7/2022 | Kang | H04B 7/06956 |
| 2022/0322325 A1* | 10/2022 | Svedman | H04W 72/046 |

\* cited by examiner

TECHNIQUES FOR SELECTING AN UPLINK CONTROL INFORMATION REPORTING MODE

CROSS REFERENCE

The present Application for Patent claims the benefit of U.S. Provisional Patent Application No. 62/961,899 by KHOSHNEVISAN et al., entitled "TECHNIQUES FOR SELECTING AN UPLINK CONTROL INFORMATION REPORTING MODE," filed Jan. 16, 2020, assigned to the assignee hereof, which is hereby incorporated by reference in its entirety.

FIELD OF TECHNOLOGY

The following relates generally to wireless communications and more specifically to techniques for selecting an uplink control information reporting mode.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a base station may communicate with a UE by transmitting downlink communications over one or more component carriers. In some cases, a UE may generate uplink control information associated with receiving downlink communications. Uplink control information may include acknowledgments of whether a downlink communication was successfully received, information about a communication channel between the base station and UE, requests for the base station to schedule uplink resources for the UE, or any combination thereof. In some cases, a base station may use uplink control information received from a UE to improve a reliability of downlink communications to the UE.

SUMMARY

The described techniques relate to selecting an uplink control information reporting mode. A communication device that is configured for carrier-aggregated communications may receive communications over multiple component carriers that use multiple serving cells. In some cases, the multiple serving cells are partitioned into multiple groups (which may be referred to as "physical uplink control channel (PUCCH) groups"). In some cases, a serving cell of a group of serving cells may be configured with uplink control resources that are configured to convey uplink control information for communications that use the group of serving cells. For example, a serving cell of a first group of serving cells (e.g., a primary serving cell) may be configured with uplink resources that are configured to convey uplink control information for communications received over component carriers that use the first group of serving cells (or received from a first transmission/reception point (TRP), for example). Also, a serving cell of a second group of serving cells (e.g., a PUCCH secondary serving cell) may be configured with uplink control resources that are configured to convey uplink control information for communications received over component carriers that use the second group of serving cells (or received from a second TRP, for example).

In some cases, a communication device may activate a mode for reporting uplink control information (or "a reporting mode") that triggers the communication device to transmit uplink control information that is separately generated for a first and second PUCCH group using PUCCH resources on respective serving cells. In some cases, the communication device may activate a reporting mode that triggers the communication device to transmit uplink control information generated that is separately generated for a first and second PUCCH group using PUCCH resources on a single serving cell. In some cases, the communication device may determine which reporting mode to activate based on signaling received from another communication device. Additionally, or alternatively, the communication device may determine whether to activate the reporting mode based on measurements taken or information calculated by the communication device. In some cases, the communication device may dynamically switch between the different reporting modes based on signaling received and/or information obtained by the communication device—e.g., to adapt to optimize a latency and reliability of uplink control information transmissions.

A method of wireless communications at a user equipment (UE) is described. The method may include identifying a first set of component carriers associated with a first group of serving cells and a second set of component carriers associated with a second group of serving cells, identifying a first serving cell of the first group of serving cells as being configured with uplink control resources for reporting uplink control information for the first set of component carriers, identifying a second serving cell of the second group of serving cells as being configured with uplink control resources for reporting uplink control information for the second set of component carriers based on the identified first set of component carriers and the second set of component carriers, selecting a mode for reporting uplink control information for the first set of component carriers and the second set of component carriers based on the first serving cell and the second serving cell, and transmitting first uplink control information for the first set of component carriers and second uplink control information for the second set of component carriers using first uplink control resources of the first serving cell based on the selected mode.

An apparatus for wireless communications at a UE is described. The apparatus may include a processor, memory coupled with the processor, and instructions stored in the memory. The instructions may be executable by the processor to cause the apparatus to identify a first set of component carriers associated with a first group of serving cells and a second set of component carriers associated with a second group of serving cells, identify a first serving cell of the first group of serving cells as being configured with uplink control resources for reporting uplink control information for the first set of component carriers, identify a second serving cell of the second group of serving cells as being configured with uplink control resources for reporting uplink control information for the second set of component carriers based on the identified first set of component carriers and the second set of component carriers, select a mode for reporting uplink control information for the first set of component carriers and the second set of component carriers based on the first serving cell and the second serving cell, and transmit first uplink control information for the first set of component carriers and second uplink control information for the second set of component carriers using first uplink control resources of the first serving cell based on the selected mode.

Another apparatus for wireless communications at a UE is described. The apparatus may include means for identifying a first set of component carriers associated with a first group of serving cells and a second set of component carriers associated with a second group of serving cells, identifying a first serving cell of the first group of serving cells as being configured with uplink control resources for reporting uplink control information for the first set of component carriers, identifying a second serving cell of the second group of serving cells as being configured with uplink control resources for reporting uplink control information for the second set of component carriers based on the identified first set of component carriers and the second set of component carriers, selecting a mode for reporting uplink control information for the first set of component carriers and the second set of component carriers based on the first serving cell and the second serving cell, and transmitting first uplink control information for the first set of component carriers and second uplink control information for the second set of component carriers using first uplink control resources of the first serving cell based on the selected mode.

A non-transitory computer-readable medium storing code for wireless communications at a UE is described. The code may include instructions executable by a processor to identify a first set of component carriers associated with a first group of serving cells and a second set of component carriers associated with a second group of serving cells, identify a first serving cell of the first group of serving cells as being configured with uplink control resources for reporting uplink control information for the first set of component carriers, identify a second serving cell of the second group of serving cells as being configured with uplink control resources for reporting uplink control information for the second set of component carriers based on the identified first set of component carriers and the second set of component carriers, select a mode for reporting uplink control information for the first set of component carriers and the second set of component carriers based on the first serving cell and the second serving cell, and transmit first uplink control information for the first set of component carriers and second uplink control information for the second set of component carriers using first uplink control resources of the first serving cell based on the selected mode.

Some examples of the method, apparatuses, and non-transitory computer-readable medium described herein may further include operations, features, means, or instructions for selecting, before selecting the mode for reporting, a different mode for reporting uplink control information for the first set of component carriers and the second set of component carriers based on the first serving cell and the second serving cell, transmitting third uplink control information for the first set of component carriers using second uplink control resources of the first serving cell and fourth uplink control information for the second set of component carriers using third uplink control resources of the second serving cell based on the different mode, and switching from the different mode to the selected mode after transmitting the third uplink control information and the fourth uplink control information.

Some examples of the method, apparatuses, and non-transitory computer-readable medium described herein may further include operations, features, means, or instructions for receiving a first set of communications over the first set of component carriers and a second set of communications over the second set of component carriers, and generating, based on the first set of communications and the second set of communications, the first uplink control information for the first set of component carriers and the second uplink control information for the second set of component carriers, the second uplink control information being generated separately from the first uplink control information.

Some examples of the method, apparatuses, and non-transitory computer-readable medium described herein may further include operations, features, means, or instructions for receiving a first set of downlink control information (DCI) messages over the first set of component carriers and a second set of DCI messages over the second set of component carriers, and identifying a location of the first uplink control resources based on the first set of DCI messages and the second set of DCI messages.

In some examples of the method, apparatuses, and non-transitory computer-readable medium described herein, the location of the first uplink control resources includes may be identified relative to a last received DCI message of the received first set of DCI messages and the received second set of DCI messages that may be received.

In some examples of the method, apparatuses, and non-transitory computer-readable medium described herein, the location of the first uplink control resources includes may be identified relative to a last received first DCI message of the received first set of DCI messages and a last received second DCI message of the received second set of DCI messages that may be received, where the first uplink control resources include a first set of uplink control resources for the first set of component carriers and a second set of uplink control resources for the second set of component carriers that may be non-overlapping in time with the first set of uplink control resources.

Some examples of the method, apparatuses, and non-transitory computer-readable medium described herein may further include operations, features, means, or instructions for multiplexing the first uplink control information for the first set of component carriers with the second uplink control information for the second set of component carriers based on the selected mode.

Some examples of the method, apparatuses, and non-transitory computer-readable medium described herein may further include operations, features, means, or instructions for receiving, from a base station, control signaling indicating that uplink control information for the first set of component carriers and that uplink control information for the second set of component carriers may be to be reported using uplink control resources of the first serving cell, where the mode for reporting uplink control information may be selected based on the received control signaling.

In some examples of the method, apparatuses, and non-transitory computer-readable medium described herein, the control signaling may include operations, features, means, or instructions for a radio resource control message for configuring the mode for reporting uplink control information, a downlink control information message including an indication first activating the mode for reporting uplink control information, a medium access control-control element that activate the mode for reporting uplink control information; or, and any combination thereof.

Some examples of the method, apparatuses, and non-transitory computer-readable medium described herein may further include operations, features, means, or instructions for determining that uplink control information for the first set of component carriers and that uplink control information for the second set of component carriers may be to be reported using uplink control resources of the first serving cell, where the mode for reporting uplink control information may be selected based on the received control signaling.

In some examples of the method, apparatuses, and non-transitory computer-readable medium described herein, a first priority of the first uplink control information and a second priority of the second uplink control information, a first payload size of the first uplink control information and a second payload size of the second uplink control information, a first code rate of the first uplink control information and a second code rate of the second uplink control information; or, and any combination thereof.

In some examples of the method, apparatuses, and non-transitory computer-readable medium described herein, a measurement of first channel conditions for the first serving cell and of second channel conditions for the second serving cell, a calculation of transmission power for simultaneously transmitting uplink control information over both the first serving cell and the second serving cell; or, and any combination thereof.

In some examples of the method, apparatuses, and non-transitory computer-readable medium described herein, the scheduled uplink data resources overlapping in time with uplink control resources of the second serving cell.

In some examples of the method, apparatuses, and non-transitory computer-readable medium described herein, an overlap in time of uplink control resources of the first serving cell with uplink control resources of the second serving cell, a scheduling of uplink data resources on the second serving cell; or, and any combination thereof.

Some examples of the method, apparatuses, and non-transitory computer-readable medium described herein may further include operations, features, means, or instructions for transmitting, to a base station, an indication of the selected mode.

Some examples of the method, apparatuses, and non-transitory computer-readable medium described herein may further include operations, features, means, or instructions for selecting, after transmitting the first uplink control information and the second uplink control information, a different mode for reporting uplink control information for the first set of component carriers and the second set of component carriers, and transmitting third uplink control information for the first set of component carriers using second uplink control resources of the first serving cell and fourth uplink control information for the second set of component carriers using third uplink control resources of the second serving cell based on the different mode.

In some examples of the method, apparatuses, and non-transitory computer-readable medium described herein, uplink control information includes a hybrid automatic repeat request codebook, a channel state information report, a scheduling request, or any combination thereof.

A method of wireless communications at a base station is described. The method may include activating a first set of component carriers that is associated with a first group of serving cells and a second set of component carriers that is associated with a second group of serving cells, configuring a first serving cell of the first group of serving cells with uplink control resources for reporting uplink control information for the first set of component carriers, configuring a second serving cell of the second group of serving cells with uplink control resources for reporting uplink control information for the second set of component carriers based on the activating, selecting a mode for reporting uplink control information for the first set of component carriers and the second set of component carriers based on the first serving cell and the second serving cell, and receiving first uplink control information for the first set of component carriers and second uplink control information for the second set of component carriers using the uplink control resources of the first serving cell based on the selecting.

An apparatus for wireless communications at a base station is described. The apparatus may include a processor, memory coupled with the processor, and instructions stored in the memory. The instructions may be executable by the processor to cause the apparatus to activate a first set of component carriers that is associated with a first group of serving cells and a second set of component carriers that is associated with a second group of serving cells, configure a first serving cell of the first group of serving cells with uplink control resources for reporting uplink control information for the first set of component carriers, configure a second serving cell of the second group of serving cells with uplink control resources for reporting uplink control information for the second set of component carriers based on the activating, select a mode for reporting uplink control information for the first set of component carriers and the second set of component carriers based on the first serving cell and the second serving cell, and receive first uplink control information for the first set of component carriers and second uplink control information for the second set of component carriers using the uplink control resources of the first serving cell based on the selecting.

Another apparatus for wireless communications at a base station is described. The apparatus may include means for activating a first set of component carriers that is associated with a first group of serving cells and a second set of component carriers that is associated with a second group of serving cells, configuring a first serving cell of the first group of serving cells with uplink control resources for reporting uplink control information for the first set of component carriers, configuring a second serving cell of the second group of serving cells with uplink control resources for reporting uplink control information for the second set of component carriers based on the activating, selecting a mode for reporting uplink control information for the first set of component carriers and the second set of component carriers based on the first serving cell and the second serving cell, and receiving first uplink control information for the first set of component carriers and second uplink control information for the second set of component carriers using the uplink control resources of the first serving cell based on the selecting.

A non-transitory computer-readable medium storing code for wireless communications at a base station is described. The code may include instructions executable by a processor to activate a first set of component carriers that is associated with a first group of serving cells and a second set of component carriers that is associated with a second group of serving cells, configure a first serving cell of the first group of serving cells with uplink control resources for reporting uplink control information for the first set of component carriers, configure a second serving cell of the second group of serving cells with uplink control resources for reporting uplink control information for the second set of component carriers based on the activating, select a mode for reporting uplink control information for the first set of component carriers and the second set of component carriers based on the first serving cell and the second serving cell, and receive first uplink control information for the first set of component carriers and second uplink control information for the second set of component carriers using the uplink control resources of the first serving cell based on the selecting.

Some examples of the method, apparatuses, and non-transitory computer-readable medium described herein may further include operations, features, means, or instructions for determining that uplink control information for the first set of component carriers and that uplink control information for the second set of component carriers may be to be reported using uplink control resources of the first serving cell, where the mode for reporting uplink control information may be selected based on the determining.

In some examples of the method, apparatuses, and non-transitory computer-readable medium described herein, a measurement of first channel conditions for the first serving cell and of second channel conditions for the second serving cell, a calculation of transmission power for simultaneously transmitting uplink control information over both the first serving cell and the second serving cell, a first priority of the first uplink control information and a second priority of the second uplink control information, a first payload size of the first uplink control information and a second payload size of the second uplink control information, a first code rate of the first uplink control information and a second code rate of the second uplink control information, an overlap in time of uplink control resources of the first serving cell with uplink control resources of the second serving cell, a scheduling of uplink data resources on the second serving cell; or, and any combination thereof.

Some examples of the method, apparatuses, and non-transitory computer-readable medium described herein may further include operations, features, means, or instructions for transmitting, to a user equipment, control signaling indicating the mode for reporting uplink control information, where the control signaling includes a radio resource control message, a downlink control information message, a medium access control-control element, or any combination thereof.

Some examples of the method, apparatuses, and non-transitory computer-readable medium described herein may further include operations, features, means, or instructions for scheduling the uplink control resources of the first serving cell based on the selected mode.

In some examples of the method, apparatuses, and non-transitory computer-readable medium described herein, the received first uplink control information may be multiplexed with the received second uplink control information.

A method of wireless communications at a UE is described. The method may include receiving a first communication from a first transmission point and a second communication from a second transmission point, identifying a first serving cell of a first group of serving cells as being configured with uplink control resources for reporting uplink control information for the first transmission point, identifying a second serving cell of a second group of serving cells as being configured with uplink control resources for reporting uplink control information for the second transmission point, determining that uplink control information for the first transmission point and uplink control information for the second transmission point is to be reported on the first serving cell based on the first serving cell and the second serving cell, and transmitting first uplink control information for the first transmission point and second uplink control information for the second transmission point using the uplink control resources of the first serving cell based on the selecting.

An apparatus for wireless communications at a UE is described. The apparatus may include a processor, memory coupled with the processor, and instructions stored in the memory. The instructions may be executable by the processor to cause the apparatus to receive a first communication from a first transmission point and a second communication from a second transmission point, identify a first serving cell of a first group of serving cells as being configured with uplink control resources for reporting uplink control information for the first transmission point, identify a second serving cell of a second group of serving cells as being configured with uplink control resources for reporting uplink control information for the second transmission point, determine that uplink control information for the first transmission point and uplink control information for the second transmission point is to be reported on the first serving cell based on the first serving cell and the second serving cell, and transmit first uplink control information for the first transmission point and second uplink control information for the second transmission point using the uplink control resources of the first serving cell based on the selecting.

Another apparatus for wireless communications at a UE is described. The apparatus may include means for receiving a first communication from a first transmission point and a second communication from a second transmission point, identifying a first serving cell of a first group of serving cells as being configured with uplink control resources for reporting uplink control information for the first transmission point, identifying a second serving cell of a second group of serving cells as being configured with uplink control resources for reporting uplink control information for the second transmission point, determining that uplink control information for the first transmission point and uplink control information for the second transmission point is to be reported on the first serving cell based on the first serving cell and the second serving cell, and transmitting first uplink control information for the first transmission point and second uplink control information for the second transmission point using the uplink control resources of the first serving cell based on the selecting.

A non-transitory computer-readable medium storing code for wireless communications at a UE is described. The code may include instructions executable by a processor to receive a first communication from a first transmission point and a second communication from a second transmission point, identify a first serving cell of a first group of serving cells as being configured with uplink control resources for reporting uplink control information for the first transmission point, identify a second serving cell of a second group of serving cells as being configured with uplink control resources for reporting uplink control information for the second transmission point, determine that uplink control information for the first transmission point and uplink control information for the second transmission point is to be reported on the first serving cell based on the first serving cell and the second serving cell, and transmit first uplink control information for the first transmission point and second uplink control information for the second transmission point using the uplink control resources of the first serving cell based on the selecting.

Some examples of the method, apparatuses, and non-transitory computer-readable medium described herein may further include operations, features, means, or instructions for receiving a first set of communications from the first transmission point and a second set of communications from the second transmission point, and generating, based on the first set of communications and the second set of communications, the first uplink control information for the first transmission point and the second uplink control information for the second transmission point, the second uplink control information being generated separately from the first uplink control information.

Some examples of the method, apparatuses, and non-transitory computer-readable medium described herein may further include operations, features, means, or instructions for receiving a first set of DCI messages from the first transmission point and a second set of DCI messages from the second transmission point, and identifying a location of the uplink control resources based on the first set of DCI messages and the second set of DCI messages.

Some examples of the method, apparatuses, and non-transitory computer-readable medium described herein may further include operations, features, means, or instructions for multiplexing the first uplink control information from the first transmission point with the second uplink control information for the second transmission point based on the selected mode.

Some examples of the method, apparatuses, and non-transitory computer-readable medium described herein may further include operations, features, means, or instructions for selecting a mode for reporting uplink control information for the first transmission point and the second transmission point based on the determining.

Some examples of the method, apparatuses, and non-transitory computer-readable medium described herein may further include operations, features, means, or instructions for receiving, from a base station, control signaling indicating that uplink control information for the first transmission point and that uplink control information for the second transmission point may be to be reported using uplink control resources of the first serving cell, where the mode for reporting uplink control information may be selected based on the received control signaling.

Some examples of the method, apparatuses, and non-transitory computer-readable medium described herein may further include operations, features, means, or instructions for determining that uplink control information for the first transmission point and that uplink control information for the second transmission point may be to be reported using uplink control resources of the first serving cell, where the mode for reporting uplink control information may be selected based on the received control signaling.

In some examples of the method, apparatuses, and non-transitory computer-readable medium described herein, a scheduling of uplink data resources for the first transmission point or the second transmission point on the second serving cell, an overlap in time of uplink control resources of the first serving cell with uplink control resources of the second serving cell; or, and any combination thereof.

DETAILED DESCRIPTION

Figure 1:
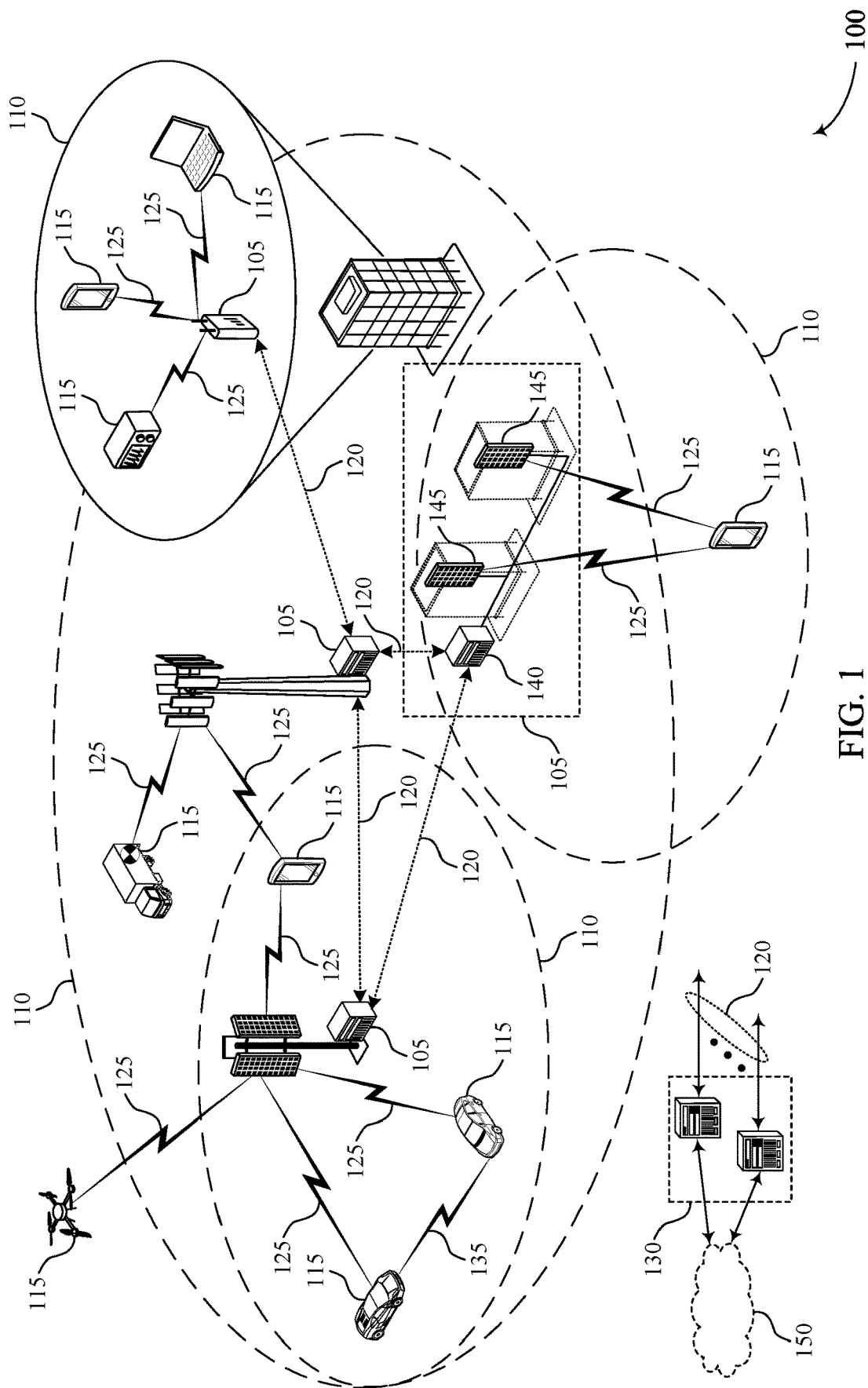
FIG. 1 illustrates an example of a wireless communications system that supports techniques for selecting an uplink control information reporting mode in accordance with various aspects of the present disclosure.

A wireless communications system may configure communication devices (e.g., base stations and UEs) to communicate with one another over multiple component carriers that use multiple serving cells. The wireless communications system may also configure communication devices to report uplink control information (UCI) for communications received over the multiple component carriers using uplink control resources. In some cases, the wireless communications system may configure uplink control resources so that a first uplink control resource on a first serving cell included in a first group of serving cells is used for transmitting first uplink control information for communications received over a first set of component carriers that use the first group of serving cells. And so that a second uplink control resource on a second serving cell included in a second group of serving cells is used for transmitting second uplink control information for communications received over a second set component carriers that use the second group of serving cells.

A wireless communications system may configure communication devices to perform communication using multiple transmission/reception points (TRPs). In some examples, the wireless communications system further configures the multiple TRPs to perform transmissions over multiple component carriers. Similar to the discussion above, the wireless communication system may configure uplink control resources so that a first uplink control resource on a first serving cell included in a first group of serving cells is used for transmitting first uplink control information for communications received from a first TRP. And so that a second uplink control resource on a second serving cell included in a second group of serving cells is used for transmitting second uplink control information for communications received from a second TRP.

By transmitting separate uplink control information over different serving cells, latency associated with reporting uplink control information may be reduced relative to if a single serving cell were used—e.g., because a communication device may transmit one set of uplink control information without waiting for another set of uplink control information to be generated. But, in some cases, one of the serving cells may have worse coverage than the other serving cell, resulting in transmission failures for one set of uplink control information.

To increase the reliability of uplink control information transmissions, an additional mode for reporting uplink control information may be used when multiple uplink control resources are configured on multiple serving cells. For example, a communication device may be configured to transmit multiple sets of separately generated uplink control information over an uplink control resource on a single serving cell when multiple uplink control resources are configured on multiple serving cells. In some cases, a communication device activates the additional reporting mode based on signaling received from another communication device and/or measurements taken by the communication device.

Moreover, to both decrease latency and increase the reliability of uplink control information transmissions, a communication device may be configured to switch between a first mode for reporting uplink control information on multiple serving cells and the additional reporting mode—e.g., to adapt to changing channel conditions. In some cases, a communication device determines whether to switch between the reporting modes based on signaling received from another communication device and/or measurements taken by the communication device.

Aspects of the disclosure are initially described in the context of wireless communications systems. Aspects of the disclosure are also described in an exemplary process that illustrates using aspects of the techniques for selecting an uplink control information reporting mode. Aspects of the disclosure are further illustrated by and described with reference to apparatus diagrams, system diagrams, and flowcharts that relate to techniques for selecting an uplink control information reporting mode.

FIG. 1 illustrates an example of a wireless communications system that supports techniques for selecting an uplink control information reporting mode in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or another network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A wireless communications system 100 may be configured so that UEs 115 transmit uplink control information (e.g., HARQ-acknowledgment (ACK) feedback, channel state information (CSI) messages, and/or scheduling request (SR) messages) to base stations 105—e.g., to increase the reliability of communications between base stations 105 and UEs 115. A UE 115 may transmit uplink control information over PUCCH resources that are scheduled for the UE 115 by the base station 105. In some examples, a UE 115 may be configured to report HARQ-ACK feedback in response to downlink transmissions received from a base station 105 indicating whether one or more of the downlink transmissions were successfully received—e.g., by including corresponding ACK or negative ACK (NACK) indicators in a HARQ-ACK feedback message—and the base station 105 may retransmit data from the downlink transmissions indicated as failed to the UE 115. In some examples, a UE 115 may be configured to report CSI to a base station 105 indicating a state of the channel between the base station 105 and UE 115, and the base station 105 may use the reported CSI to adapt transmission parameters for subsequent transmissions to the UE 115, increasing a reliability of the subsequent transmissions over the channel. In some cases, a UE 115 may transmit an SR message to a base station 105 requesting that the base station 105 allocate uplink resources to the UE 115—e.g., so the UE 115 can transmit uplink control and/or uplink data to the base station 105—and the base station 105 may schedule uplink resources to the UE 115.

A wireless communications system 100 may be configured so that base stations 105 and UEs 115 communicate with one another using multiple component carriers—e.g., to increase throughput of communications between the base station 105 and UE 115. When multiple component carriers are used for communications, a base station 105 and a UE 115 may be configured to perform simultaneous communications to one another over the multiple component carriers. The use of multiple component carriers to communicate data between wireless devices may also be referred to as carrier aggregation. In some cases, each component carrier may be associated with a serving cell, and the combination of serving cells used by the component carriers may be referred to as a cell group. In some cases, the serving cells in a cell group may have different coverage levels and/or use different frequency ranges. For example, a primary serving cell (which may also be referred to as a primary cell) may have improved coverage characteristics relative to one or more secondary serving cells (which may also be referred to as secondary cells)—e.g., based on the primary serving cell using the lowest frequency band. In some cases, the serving cells in a cell group may be associated with different subcarrier spacings. For example, a first serving cell may be configured for a subcarrier spacing of 15 KHz and a second serving cell may be configured for a subcarrier spacing of 120 KHz.

Similar to the above discussion regarding transmitting uplink control information, a UE 115 that receives communications over multiple component carriers may be configured to report uplink control information for each of the component carriers on PUCCH resources—e.g., the UE 115 may transmit over PUCCH resources an ACK/NACK message, a CSI message, and/or an SR message for each of the component carriers. In some examples, the wireless communications system 100 may configure a UE 115 in a mode for reporting uplink control information for each of the component carriers on "primary PUCCH resources"— PUCCH resources that occur solely within a primary cell. When reporting uplink control information for all of the component carriers on primary PUCCH resources, the UE 115 may report a single HARQ-ACK codebook generated for all of the component carriers—e.g., based on downlink assignment indicators included in physical downlink control channel (PDCCH) messages and/or physical downlink shared channel (PDSCH) occasions. Additionally, or alternatively, when reporting uplink control information for each of the component carriers on primary PUCCH resources, the UE 115 may report a single CSI message and/or SR message generated for all of the component carriers.

By configuring a UE 115 to report uplink control information for all of the component carriers using primary PUCCH resources, a reliability of uplink control information transmissions may be increased—e.g., when the primary cell is associated with superior coverage relative to the secondary cells. That said, reporting uplink control information for each component carrier on primary PUCCH resources may delay the reporting of uplink control information for one or more of the component carriers. For example, a UE 115 may compute first uplink control information for a component carrier with a larger subcarrier spacing (e.g., 120 KHz) in less time than second uplink control information for a component carrier with a smaller subcarrier spacing (e.g., 15 KHz). But to support the combined reporting of uplink control information for all of the component carriers on primary PUCCH resources, the UE 115 may wait to report the first uplink control information—e.g., may buffer the first uplink control information—until the second uplink control information is computed.

In some examples, the wireless communications system 100 may configure a UE 115 in a mode for reporting "primary uplink control information"—first uplink control information calculated for a first group of component carriers that occur on a first set of serving cells that include a primary cell—on primary PUCCH resources and "secondary uplink control information"—second uplink control information computed for a second group of component carriers that occur on a second set of serving cells—on "secondary PUCCH resources." Secondary PUCCH resources may be resources that occur solely within a "PUCCH secondary cell"—a secondary cell that is configured with PUCCH resources. In such cases, the first group of component carriers may be associated with a "primary PUCCH group"—a group of serving cells including a primary cell and one or more secondary cells. And the second group of component carriers may be associated with a "secondary PUCCH group"—a group of serving cells including a PUCCH secondary cell and one or more secondary cells. When reporting uplink control information for a first group of component carriers on primary PUCCH resources and uplink control information for a second group of component carriers on secondary PUCCH resources, a UE 115 may generate separate HARQ-ACK codebooks for the different groups of component carriers—e.g., based on downlink assignment indicators included in PDCCH messages and/or PDSCH occasions. Additionally, or alternatively, when reporting uplink control information for a first group of component carriers on primary PUCCH resources and uplink control information for a second group of component carriers on secondary PUCCH resources, the UE 115 may generate separate CSI and/or SR messages for the different groups of component carriers.

By configuring a UE 115 to separately report primary and secondary uplink control information, uplink control information for different component carriers may be separately computed and delays associated with reporting the uplink control information on a single primary PUCCH resource may be eliminated or decreased. For example, a primary PUCCH group may be associated with a first subcarrier spacing while a secondary PUCCH group may be associated with a second subcarrier spacing. As discussed above, uplink control information may be computed in less time for the group of component carriers having the larger subcarrier spacing. By configuring a primary PUCCH group, primary uplink control information may be transmitted over the primary PUCCH resources as soon as the primary uplink control information is computed. And by configuring a secondary PUCCH group, secondary uplink control information may be transmitted over the secondary PUCCH resources as soon as the secondary uplink control information is computed. This way, the primary or the secondary uplink control information (whichever is associated with a larger subcarrier spacing) may be transmitted without waiting for the other uplink control information to be computed. That said, the transmission of the secondary uplink control information over the secondary PUCCH resources may be less reliable than the transmission of the primary uplink control information over the primary PUCCH resources—e.g., if the PUCCH secondary cell has worse coverage than the primary cell—or vice versa.

In some cases, a wireless communications system 100 may be configured so that a UE 115 receives communications from multiple TRPs 145. In some cases, communications transmitted from the different TRPs 145 include separate downlink control information (DCI) messages. In some cases, a first component carrier may be used to carry a transmission from a first TRP 145 and a second component carrier may be used to carry a transmission from a second TRP 145. In some examples, a first component carrier may be used to carry a transmission from a first TRP 145 and another transmission from a second TRP 145, and a second component carrier may be used to carry a transmission only from the first TRP 145. In some examples, the transmissions from the first and second TRPs may be received on a primary cell. In some examples, the transmission from the first and second TRPs may be received on a secondary cell.

Similar to the above discussion regarding transmitting uplink control information, a UE 115 that receives communications from multiple TRPs may be configured to report uplink control information for each of the received communications. In some examples, the wireless communications system 100 may configure a UE 115 in a mode for reporting uplink control information for the TRPs on PUCCH resources that occur on a single serving cell. For example, if a UE 115 receives information from a first TRP and a second TRP over one or more component carriers in the first PUCCH group, the UE 115 may report corresponding uplink control information for the first TRP and the second TRP over primary PUCCH resources. In another example, if a UE 115 receives information from a first TRP and a second TRP over one or more component carriers in the second PUCCH group, the UE 115 may report corresponding uplink control information for the first TRP and the second TRP over either primary PUCCH resources or secondary PUCCH resources—e.g., if a PUCCH secondary cell is configured and linked to the secondary cell. In some cases, first uplink control information for the first TRP is multiplexed in time (or TDM'ed) with second uplink control information for the second TRP—e.g., if the backhaul condition between the two TRPs is non-ideal. That is, the first uplink control information may be transmitted over a first portion of the PUCCH resources and the second uplink control information may be transmitted over a second portion of the PUCCH resources that occurs after the first portion in time. In some cases, TDM'ing the first uplink control information and the second uplink control information decreases a reliability or coverage of the transmissions—e.g., because the individual transmissions are shorter and more susceptible to interference.

In some examples, the wireless communications system 100 may configure a UE 115 in a mode for reporting uplink control information for the TRPs on PUCCH resources that occur on multiple serving cells—e.g., on a primary cell and PUCCH secondary cell. For example, regardless of whether a UE 115 receives information from a first TRP and a second TRP over one or more component carriers on a primary cell or a secondary cell, a UE 115 may report uplink control information for the first TRP on primary PUCCH resources and uplink control information for the second TRP on secondary PUCCH resources, or vice versa. In some cases, a UE 115 is configured in the mode for reporting uplink control information on multiple serving cells when multiple PUCCH groups are configured. By separately transmitting uplink control information for the first and second TRPs on PUCCH resources that occur on different serving cells (e.g., over primary and secondary PUCCH resources), uplink control information for both TRPs may be transmitted simultaneously. That said, the transmission of uplink control information for one of the TRPs over the secondary PUCCH resources may be less reliable than the transmission of the uplink control information for the other TRP over the primary PUCCH resources—e.g., if the secondary cell has worse coverage than the primary cell—or vice versa.

In some cases, a wireless communications system 100 may configure a UE 115 to use one of the above modes for reporting uplink control information for multiple component carriers. However, while operating in one of the reporting modes, a UE 115 may be unable to exploit the benefits of the other reporting modes (e.g., lower latency, higher reliability, etc.). For example, uplink control information reporting may suffer from reporting delays if a reporting mode that uses a single set of PUCCH resources (e.g., primary PUCCH resources) is used for reporting uplink control information. In another example, uplink control information reporting may suffer from transmission failure if a reporting mode that uses multiple sets of PUCCH resources (e.g., primary and secondary PUCCH resources) is used for reporting uplink control information—e.g., if one of the PUCCH resources is less reliable. Moreover, a UE 115 may be unable to switch between the modes without being reconfigured by the wireless communications system 100, preventing a UE 115 from adapting with changing channel conditions that may favor one reporting mode over another.

To increase the latency and/or reliability of uplink control information transmissions, techniques for combining aspects of the reporting modes may be used by a UE 115 that is configured with multiple PUCCH groups. For example, a UE 115 that is configured to report separately computed control information over primary and secondary PUCCH resources may determine whether to report first and second uplink control information either over only the primary PUCCH resources—e.g., to increase reliability—or over respective primary and secondary PUCCH resources—e.g., to reduce latency. In some cases, a base station 105 signals to the UE 115 whether the UE 115 is to report the first and second uplink control information over solely the primary PUCCH resources (or solely over the secondary PUCCH resources) or over respective primary and secondary PUCCH resources—e.g., based on measurements taken or information received by the base station 105. In some case, to enable a UE 115 to adapt to changing channel conditions, the UE 115 may determine whether to report the first and second uplink control information over solely the primary PUCCH resources or over the respective primary and secondary PUCCH resources—e.g., based on measurements taken or information received by the UE 115.

Figure 2:
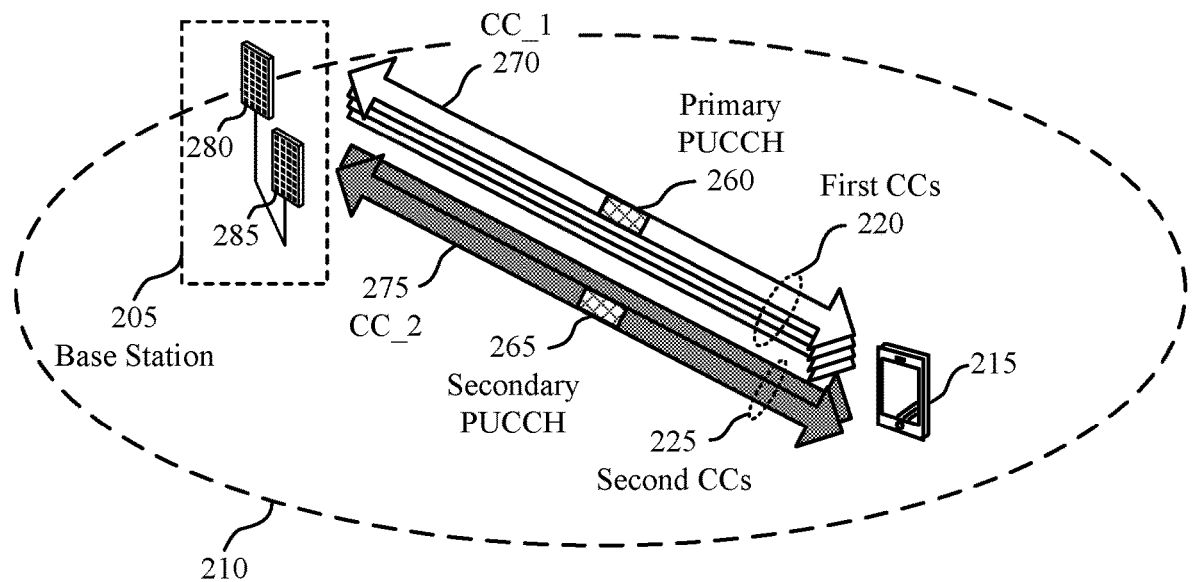
FIG. 2 illustrates an example of a wireless communications subsystem that supports techniques for selecting an uplink control information reporting mode in accordance with various aspects of the present disclosure.
Figure 2:
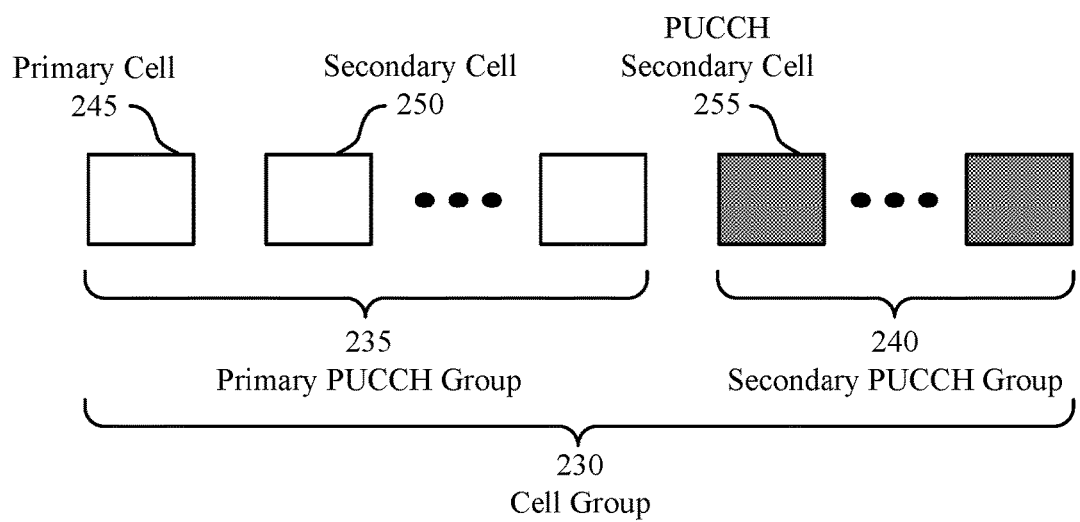

FIG. 2 illustrates an example of a wireless communications subsystem that supports techniques for selecting an uplink control information reporting mode in accordance with various aspects of the present disclosure. Wireless communications subsystem 200 may include base station 205 and UE 215 which may be examples of a base station or UE described above with reference to FIG. 1. In some cases, base station 205 may include first TRP 280 and second TRP 285, which may be examples of a TRP 145 as described with reference to FIG. 1. Base station 205 and UE 215 may communicate within coverage area 210, as described above with reference to FIG. 1.

As discussed above and herein, reporting uplink control information over solely a primary cell for multiple component carriers may delay the reporting of uplink control information—e.g., if one or more of the component carriers have different subcarrier spacings. As also discussed above and herein, reporting, over a primary cell, uplink control information for a first group of component carriers included in a primary PUCCH group, and over a PUCCH secondary cell, uplink control information for a second group of component carriers included in a secondary PUCCH group may result in transmission failures—e.g., if a coverage level of the PUCCH secondary cell is worse than a coverage level of the primary cell. To reduce latency and/or increase the reliability of uplink control information transmissions when serving cells are separated into PUCCH groups, a wireless device may be configured to determine whether to transmit the computed uplink control information over solely the primary cell or over the primary cell and the PUCCH secondary cell—e.g., based on channel conditions.

In some examples, base station 205 may transmit to UE 215 control signaling that activates multiple component carriers (including first component carriers 220 and second component carriers 225) for carrier-aggregated communications between base station 205 and UE 215. Base station 205 may also transmit control signaling that configures cell group 230 which may include multiple serving cells, where the activated component carriers may be transmitted using the serving cells included in cell group 230. For example, a component carrier may use frequency resources allocated to a serving cell in cell group 230. Base station 205 may further transmit control signaling that configures the available serving cells into a primary PUCCH group 235 and secondary PUCCH group 240. In some cases, primary PUCCH group 235 may include primary cell 245 and one or more secondary cells (including secondary cell 250). Primary cell may be configured with PUCCH resources for conveying uplink control information generated for communications received over the serving cells included in primary PUCCH group 235. In some cases, secondary PUCCH group 240 may include one or more secondary cells including PUCCH secondary cell 255. PUCCH secondary cell 255 may be a secondary cell that is configured with PUCCH resources for conveying uplink control information generated for communications received over the serving cells included in secondary PUCCH group 240.

In some cases, first component carriers 220 may use the serving cells included in primary PUCCH group 235, and second component carriers 225 may use the serving cells included in secondary PUCCH group 240. In some cases, primary PUCCH group 235 may be associated with primary PUCCH resources (e.g., primary PUCCH resources 260) that occur in primary cell 245 and secondary PUCCH group 240 may be associated with secondary PUCCH resources (e.g., secondary PUCCH resources 265) that occur in PUCCH secondary cell 255. That is, uplink control information generated for receiving communications over the serving cells in primary PUCCH group 235 (e.g., over first component carriers 220) may be transmitted over primary PUCCH resources 260. And uplink control information generated for receiving communications over the serving cells in secondary PUCCH group 240 (e.g., over second component carriers 225) may be transmitted over secondary PUCCH resources 265. In some examples, first component carrier 270 may use primary cell 245—e.g., may use frequency resources dedicated to primary cell 245—and may carry primary PUCCH resources 260, and second component carrier 275 may use PUCCH secondary cell 255 and may carry secondary PUCCH resources 265.

After activating the component carriers and configuring the PUCCH groups, base station 205 may transmit downlink information to UE 215 over the component carriers. UE 215 may receive the downlink information over the component carriers and may generate first uplink control information (e.g., a HARQ-ACK codebook, a CSI report, or SR) for the downlink information transmitted over first component carriers 220 (or primary PUCCH group 235). And UE 215 may separately generate second uplink control information for the downlink information transmitted over second component carriers 225 (or secondary PUCCH group 240). In some cases, the first uplink control information may be referred to as "primary uplink control information" and the second uplink control information may be referred to as "secondary uplink control information."

After generating primary and secondary uplink control information, UE 215 may determine whether to report the primary and secondary uplink control information over respective primary and secondary PUCCH resources (e.g., primary PUCCH resources 260 and secondary PUCCH resources 265). Or to report the primary and secondary uplink control information over solely primary PUCCH resources (e.g., primary PUCCH resources 260). Or alternatively, to report the primary and secondary uplink control information over solely secondary PUCCH resources (e.g., secondary PUCCH resources 265).

In some examples, UE 215 determines whether to transmit the primary and secondary uplink control information over one or both of primary and secondary PUCCH resources based on receiving control signaling (e.g., radio resource control (RRC) signaling, MAC-control element (CE) messaging, or DCI messaging) from base station 205. For example, UE 215 may determine that primary and secondary uplink control information are to be transmitted over primary PUCCH resources (e.g., primary PUCCH resources 260) based on receiving control signaling that activates at UE 215 a reporting mode for transmitting the primary and secondary uplink control information over primary PUCCH resources. Alternatively, UE 215 may determine that primary and secondary uplink control information are to be transmitted over respective primary and secondary PUCCH resources (e.g., primary PUCCH resources 260 and secondary PUCCH resources 265) based on receiving control signaling that activates at UE 215 a reporting mode for transmitting the primary and secondary uplink control information over primary PUCCH resources. In some cases, the control signaling activates the indicated reporting mode at UE 215 for one or more subsequent transmissions. In other cases, the control signaling activates the indicated reporting mode at UE 215 indefinitely—e.g., until additional control signaling activating a different reporting mode is received.

In some examples, base station 205 determines whether to schedule uplink control information reporting over one or both of primary and secondary PUCCH resources based on information obtained by base station 205—e.g., based on measurements taken by base station 205 and/or messages received from UE 215. In some examples, base station 205 may determine which reporting resources to schedule based on measuring the channel quality for primary cell 245 and the channel quality for PUCCH secondary cell 255. For example, base station 205 may schedule primary PUCCH resources (e.g., primary PUCCH resources 260) for uplink control information reporting based on determining that the channel quality of primary cell 245 exceeds the channel quality of PUCCH secondary cell 255 by a threshold amount. In some examples, base station 205 may determine which reporting resources to schedule based on a power headroom report received from UE 215 indicating transmission power for uplink transmissions over primary cell 245 and uplink transmission over PUCCH secondary cell 255. For example, base station 205 may schedule primary PUCCH resources (e.g., primary PUCCH resources 260) for uplink control information reporting based on determining that UE 215 will reach a maximum transmission power if UE 215 transmits the primary and secondary uplink control information over both primary and secondary PUCCH resources (e.g., primary PUCCH resources 260 and secondary PUCCH resources 265).

In some examples, base station 205 may determine which reporting resources to schedule based on a priority of the primary uplink control information generated relative to the priority of the secondary uplink control information. In some examples, base station 205 may determine which reporting resources to schedule based on a payload size or code rate of the primary uplink control information relative to the payload size or code rate of the secondary uplink control information. In some examples, base station 205 may determine which reporting resources to schedule based on whether PUCCH resources scheduled for the transmission of the primary uplink control information overlap with PUCCH resources scheduled for the transmission of the secondary uplink control information. In some examples, base station 205 may determine which reporting resources to schedule based on whether PUCCH secondary cell 255 includes physical uplink shared channel (PUSCH)

resources. After determining which reporting resources to schedule, base station 205 may transmit control signaling to activate the corresponding reporting mode at UE 215. In other examples, UE 215 may determine which reporting mode is scheduled based on measurements taken by UE 215 and may activate the reporting mode.

In some examples, UE 215 may determine whether to transmit separately generated uplink control information over one or both of primary and secondary PUCCH resources—e.g., based on measurements taken by UE 215 and/or other information determined by UE 215. In some cases, base station 205 schedules both primary and secondary PUCCH resources for UE 215 to report primary and secondary uplink control information. In some examples, UE 215 may determine which reporting resources to use based on a channel quality of primary cell 245 relative to a channel quality of PUCCH secondary cell 255. In some cases, UE 215 determines channel quality (e.g., RSRP) based on downlink reference signal or synchronization signal block measurements. In some examples, UE 215 may determine which reporting resources to use based on a transmission power for transmitting the uplink control information. For example, UE 215 may report both primary and secondary uplink control information over primary PUCCH resources (e.g., primary PUCCH resources 260) based on determining that a transmission power for transmitting the primary and secondary uplink control information over primary and secondary PUCCH resources (e.g., primary PUCCH resources 260 and secondary PUCCH resources 265) would reach or exceed a maximum transmit power for UE 215.

In some examples, UE 215 may determine which reporting resources to use based on whether PUCCH resources scheduled for the transmission of the primary uplink control information overlap with PUCCH resources scheduled for the transmission of the secondary uplink control information. In some cases, the primary and secondary uplink control information includes sets of primary and secondary uplink control information. For example, UE 215 may report both primary and secondary uplink control information over primary PUCCH resources based on determining that primary PUCCH resources for reporting any of the set of primary uplink control information overlaps in time with secondary PUCCH resources for reporting any of the set of secondary uplink control information.

In some examples, UE 215 may determine which reporting resources to use based on whether PUCCH secondary cell 255 includes PUSCH resources. For example, UE 215 may report both primary and secondary uplink control information over primary PUCCH resources if no PUSCH resources are scheduled on PUCCH secondary cell 255. In some examples, UE 215 may determine which reporting resources to use based on whether PUCCH secondary cell 255 includes scheduled PUSCH resources and whether the scheduled PUSCH resources overlap with the secondary PUCCH resources 265. For example, UE 215 may report both the primary and secondary uplink control information over primary PUCCH resources if PUSCH resources that are scheduled on PUCCH secondary cell 255 do not overlap with secondary PUCCH resources.

In some examples, UE 215 may determine which reporting resources to use based on a priority of the primary uplink control information relative to a priority of the secondary uplink control information. For example, UE 215 may report the primary and secondary uplink control information over primary and secondary PUCCH resources (e.g., primary PUCCH resources 260 and secondary PUCCH resources 265) based on determining that the primary and secondary uplink control information have different priorities—e.g., if one of the uplink control information carries URLLC data and the other uplink control information carries eMBB information. In some examples, UE 215 may determine which reporting resources to use based on a payload size or code rate of the primary uplink control information relative to the payload size or code rate of the secondary uplink control information.

In some examples, UE 215 may be configured in a default mode of operation that configures UE 215 to transmit primary and secondary uplink control information over respective primary PUCCH resources and secondary PUCCH resources. In such examples, UE 215 may override the default mode of operation and transmit primary and secondary uplink control information over solely primary PUCCH resources based on signaling received from base station 205 and/or based on information determined by UE 215. In some cases, base station 205 may signal for UE 215 to transmit primary and secondary uplink control information over solely primary PUCCH resources based on the techniques described above. In some cases, UE 215 may determine to use solely primary PUCCH resources to transmit primary and secondary uplink control information based on the techniques described above.

After deciding to report both primary and secondary uplink control information over solely primary PUCCH resources—e.g., based on activating a corresponding reporting mode—UE 215 may identify primary PUCCH resources for separately generated primary and secondary uplink control information. In some examples, UE 215 may identify primary PUCCH resources for reporting primary and secondary uplink control information based on a PUCCH resource indicator (PRI) included in the last DCI message received across first component carriers 220 and second component carriers 225. For example, after receiving a set of communications over first component carriers 220 and second component carriers 225, UE 215 may determine that primary PUCCH resources for reporting the separately generated uplink control information (e.g., primary PUCCH resources 260) occur a set duration after the last communication is received—e.g., based on a DCI message (and PRI) included in the last communication.

After identifying the primary PUCCH resources for reporting the primary and secondary uplink control information, UE 215 may transmit the primary and secondary uplink control information over the primary PUCCH resources. In some case, UE 215 may multiplex the primary and secondary uplink control information together—e.g., in time and/or frequency.

As discussed above and herein, reporting, over solely a primary cell, uplink control information for multiple TRPs may reduce the reliability of uplink control information transmissions—e.g., if the uplink control information for the different TRPs is TDM'ed. As also discussed above and herein, reporting, over a primary cell, uplink control information for a first TRP, and over a PUCCH secondary cell, uplink control information for a second TRP may result in transmission failures—e.g., if a coverage level of the PUCCH secondary cell is worse than a coverage level of the primary cell 245. To increase the reliability of uplink control information transmissions when serving cells are separated into PUCCH groups, a wireless device may be configured to determine whether to transmit the computed uplink control information over solely the primary cell or over the primary cell and the PUCCH secondary cell—e.g., based on channel conditions.

In some examples, base station 205 may transmit to UE 215 control signaling that activates multiple component carriers (including first component carriers 220 and second component carriers 225) for carrier-aggregated communications between base station 205 and UE 215. Base station 205 may also transmit control signaling that configures primary PUCCH group 235 and secondary PUCCH group 240, where primary PUCCH group 235 may include first component carriers 220 and secondary PUCCH group 240 may include second component carriers 225. In some cases, primary PUCCH group 235 is associated with primary PUCCH resources (e.g., primary PUCCH resources 260) that occur in primary cell 245 and secondary PUCCH group 240 is associated with secondary PUCCH resources (e.g., secondary PUCCH resources 265) that occur in PUCCH secondary cell 255. In some examples, base station 205 may also transmit to UE 215 control signaling that activates transmissions from multiple TRPs (e.g., first TRP 280 and second TRP 285). In some cases, base station 205 may also transmit to UE 215 control signaling indicating that control information generated for one TRP (e.g., first TRP 280) is to be transmitted over primary PUCCH resources and control information generated for another TRP (e.g., second TRP 285) is to be transmitted over secondary PUCCH resources.

In some examples, first TRP 280 and second TRP 285 may transmit information to UE 215 using one or more of first component carriers 220 and second component carriers 225. UE 215 may receive the information from first TRP 280 and second TRP 285 and may generate first uplink control information (e.g., a HARQ-ACK codebook, a CSI report, or SR) for the downlink information transmitted from first TRP 280. And UE 215 may separately generate second uplink control information for the downlink information transmitted from second TRP 285. In some cases, the first uplink control information may be referred to as "first TRP uplink control information" and the second uplink control information may be referred to as "second TRP uplink control information."

After generating first and second TRP uplink control information, UE 215 may determine whether to report the first and second TRP uplink control information over respective primary and secondary PUCCH resources (e.g., primary PUCCH resources 260 and secondary PUCCH resources 265). Or to report the first and second TRP uplink control information over solely primary PUCCH resources (e.g., primary PUCCH resources 260). In some examples, UE 215 may receive signaling from base station 205 indicating whether to report the first and second TRP uplink control information over one or both of primary and secondary PUCCH resources. In some cases, base station 205 may determine which reporting resources to schedule based on the techniques described above for reporting uplink control information for multiple component carriers.

In some examples, UE 215 may determine whether to transmit uplink control information that is separately generated for multiple TRPs over one or both of primary and secondary PUCCH resources. In some cases, UE 215 may determine which reporting resources to use based on the techniques described above for reporting uplink control information for multiple component carriers. In some examples, UE 215 may determine which reporting resources to use based on whether PUSCH resources on PUCCH secondary cell 255 are scheduled by first TRP 280 or second TRP 285. In some examples, UE 215 may determine which reporting resources to use based on whether first TRP uplink control information and second TRP uplink control information is scheduled to be transmitted over overlapping PUCCH resources. For example, UE 215 may transmit first TRP uplink control information over primary PUCCH resources (e.g., primary PUCCH resources 260) and second TRP uplink control information over secondary PUCCH resources (e.g., secondary PUCCH resources 265) after determining that first TRP uplink control information and second TRP uplink control information are scheduled for PUCCH resources that overlap in time.

Figure 3:
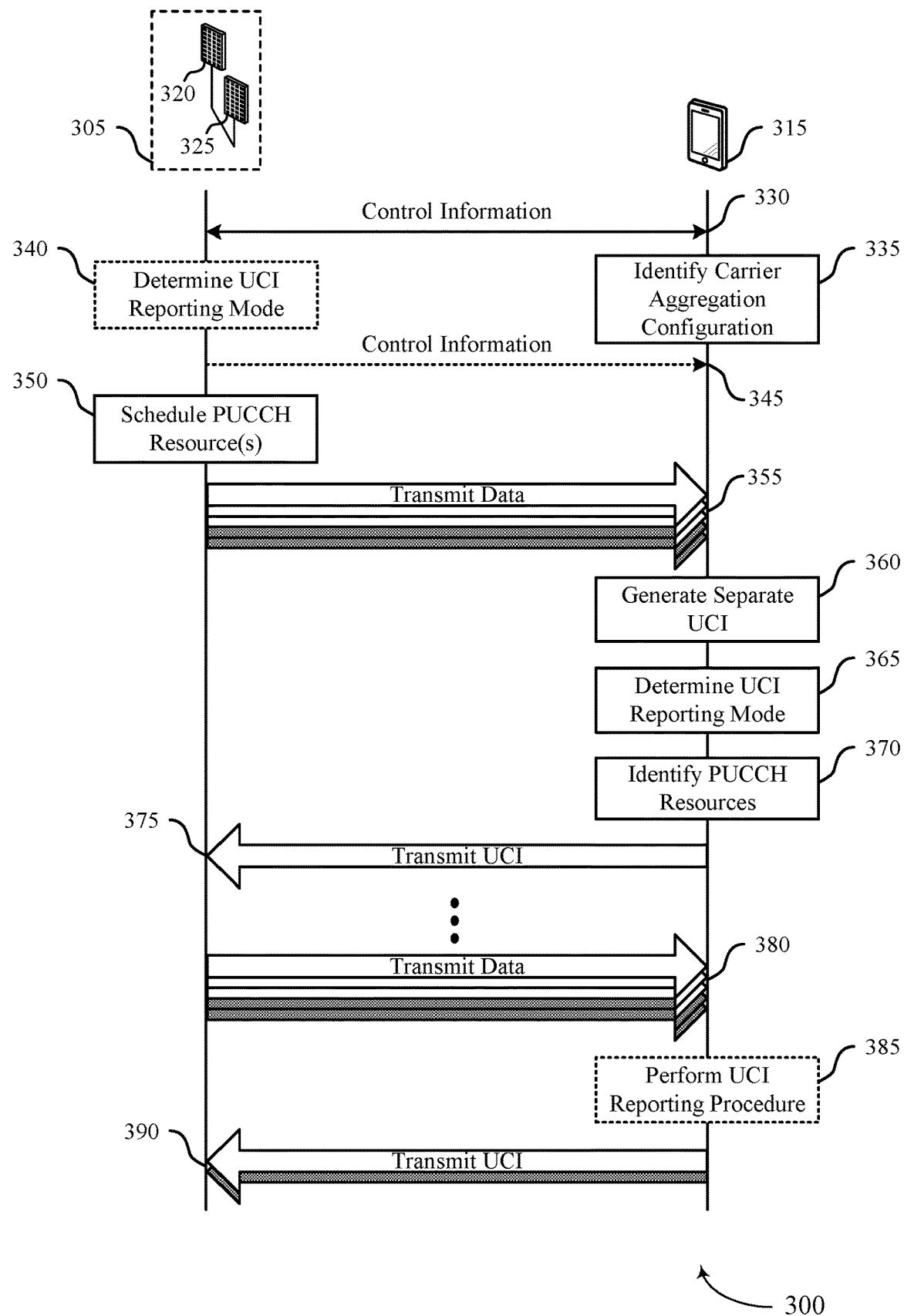
FIG. 3 illustrates aspects of a process for selecting an uplink control information reporting mode in accordance with various aspects of the present disclosure.

FIG. 3 illustrates aspects of a process for selecting an uplink control information reporting mode in accordance with various aspects of the present disclosure. Process flow 300 may be performed by base station 305 and UE 315, which may be examples of a base station or UE described above with reference to FIGS. 1 and 2. In some cases, base station 305 may include first TRP 320 and second TRP 325, which may be examples of a TRP described above with reference to FIGS. 1 and 2.

In some examples, process flow 300 illustrates aspects of a process for base station 105 to identify PUCCH resources for the transmission of first uplink control information and separately generated second uplink control information. Additionally, or alternatively, process flow 300 illustrates aspects of a process for UE 315 to identify PUCCH resources for the transmission of first uplink control information and separately generated second uplink control information. In some cases, the first uplink control information is generated for a first set of component carriers and the second uplink control information is generated for a second set of component carriers. In some cases, the first uplink control information is generated for a first TRP and the second uplink control information is generated for a second TRP.

At arrow 330, base station 305 may exchange control information with UE 315. In some examples, UE 315 may transmit control signaling to base station 305 indicating a capability to perform carrier-aggregated communications. UE 315 may also transmit control signaling to base station 305 indicating a capability to transmit uplink control information over one PUCCH resource when multiple PUCCH groups are configured. In some examples, base station 305 may transmit control signaling to UE 315 indicating that carrier-aggregated communications are configured. Base station 305 may also transmit control signaling indicating that multiple serving cells will be used to support the carrier-aggregated communications. And base station 305 may also transmit control signaling used to activate component carriers on the different serving cells. In some examples, base station 305 may also transmit control signaling indicating a PUCCH grouping of the configured serving cells—e.g., the control signaling may indicate that a first set of the serving cells are included in a first PUCCH group and that a second set of the serving cells are included in a second PUCCH group.

In some examples, UE 315 may transmit control signaling to base station 305 indicating a capability to receive uplink control information from multiple TRPs. And base station 305 may transmit control signaling to UE 315 indicating that multi-TRP communications are configured for transmissions to UE 315.

At block 335, UE 315 may identify (or activate) a set of component carriers and a set of serving cells based on the exchanged control information. UE 315 may also identify which component carriers are associated with which serving cells. In some cases, UE 315 may also identify a first subset of serving cells (including a primary cell) that is included in a first PUCCH group and second subset of serving cells (including a PUCCH secondary cell) that is included in a second PUCCH group. Accordingly, UE 315 may also identify a first subset of the component carriers using the first subset of serving cells, where a component carrier in the first subset of component carriers is associated with the primary cell and is configured to transmit uplink control information generated for the first subset of the component carriers. And a second subset of the component carriers using the second subset of serving cells, where a component carrier of the second subset of component carriers is associated with the PUCCH secondary cell and is configured to transmit uplink control information generated for the second subset of the component carriers. In some cases, UE 315 may activate a reporting mode that triggers UE 315 to transmit uplink control information generated for the first subset of the component carriers over the primary cell and uplink control information generated for the second subset of the component carrier over the PUCCH secondary cell based on determining that the PUCCH groups are configured—e.g., as a default mode of operation.

In some examples, UE 315 may similarly activate a reporting mode that triggers UE 315 to transmit uplink control information generated for first TRP 320 over the primary cell and uplink control information generated for second TRP 325 over the PUCCH secondary cell based on determining that the PUCCH groups are configured—e.g., as a default mode of operation.

At block 340, base station 305 may determine an uplink control information reporting mode for carrier-aggregated communications. In some cases, base station 305 activates a mode for reporting uplink control information that triggers UE 315 to transmit uplink control information for all activated component carriers over a primary PUCCH resource—e.g., if PUCCH groups are not configured. In some cases, base station 305 activates a mode for reporting uplink control information that triggers UE 315 to transmit first uplink control information (e.g., uplink control information for a first subset of component carriers and/or first TRP 320) over a primary PUCCH resource and second uplink control information (e.g., uplink control information for a second subset of component carriers and/or second TRP 325) over a secondary PUCCH resource—e.g., if PUCCH groups are configured.

In some cases, base station 305 may activate a mode for reporting uplink control information that triggers UE 315 to transmit first uplink control information (e.g., uplink control information for a first subset of component carriers and/or first TRP 320) and second uplink control information (e.g., uplink control information for a second subset of component carriers and/or second TRP 325) over the primary PUCCH resource when PUCCH groups are configured. In some examples, base station 305 determines which reporting mode to activate based on channel qualities of the primary and PUCCH secondary serving cells, a power headroom report received from UE 315, a priority associated with separate uplink control information generated by UE 315, a payload size and/or code rate of the separate uplink control information generated by UE 315, whether a timing for reporting first uplink control information generated by UE 315 overlaps with a timing for reporting second uplink control information generated by UE 315, whether a PUCCH secondary cell carries a PUSCH for UE 315, or any combination thereof, as discussed herein and with reference to FIG. 2.

At arrow 345, base station 305 may transmit control information to UE 315. In some cases, the transmitted control information indicates to UE 315 a selected mode for reporting uplink control information—e.g., based on the above determining. In some cases, base station 305 refrains from transmitting control information to UE 315—e.g., if base station 305 selects a default reporting mode based on the determining.

At block 350, base station 305 may schedule one or more PUCCH resources for UE 315 to report uplink control information. In some examples, the scheduled PUCCH resource may be indicated in the transmitted control information. In some examples, base station 305 schedules a first PUCCH resource in a primary cell and a second PUCCH resource in a PUCCH secondary cell. In some cases, base station 305 schedules the first and second PUCCH resources after determining that a mode for reporting that triggers UE 315 to transmit separately generated uplink control information over respective primary and secondary PUCCH resources is to be used for reporting uplink control information. In some examples, base station 305 schedules a first PUCCH resource in a primary cell and does not schedule a second PUCCH resource in a PUCCH secondary cell after determining that a mode for reporting that triggers UE 315 to transmit separately generated uplink control information over solely a primary PUCCH resource is to be used for reporting uplink control information. In some examples, after determining that a mode for reporting that triggers UE 315 to transmit separately generated uplink control information over solely a primary PUCCH resource is to be used, base station 305 continues to schedule first and second PUCCH resources. Scheduling both first and second PUCCH resources in such cases may enable base station 305 to support erroneous uplink control transmissions over both PUCCH resources if UE 315 fails to activate the corresponding reporting mode—e.g., if UE 315 fails to receive control signaling or makes a different determination of the reporting mode than base station 305.

At arrow 355, base station 305 may transmit data to UE 315 over the activated component carriers. In some examples, base station 305 transmits a first set of data over a first set of component carriers that is associated with a first PUCCH group and transmits a second set of data over a second set of component carriers that is associated with a second PUCCH group.

In some examples, base station 305 may use first TRP 320 to transmit a first set of data over one or more of the activated component carriers and may use second TRP 325 to transmit a second set of data over the same or a different combination of one or more of the activated component carriers.

At block 360, UE 315 may generate separate uplink control information messages for the communications received over the activated component carriers and/or from multiple TRPs. In some cases, UE 315 may separately generate first uplink control information for communications received over the first set of component carriers and second uplink control information for communications received over the second set of component carriers. Additionally, or alternatively, UE 315 may separately generate first uplink control information for communications received from first TRP 320 and second uplink control information for communications received from second TRP 325.

At block 365, UE 315 may determine a mode for reporting the separately generated uplink control information. In some examples, UE 315 may determine the mode for reporting by activating a default mode for reporting uplink control information when multiple PUCCH groups are activated—e.g., UE 315 may activate a default reporting mode that triggers UE 315 to transmit the separately generated uplink control information over respective primary and secondary PUCCH resources. In some examples, UE 315 may determine the mode for reporting based on control signaling received from base station 305. For example, UE 315 may activate a reporting mode that triggers UE 315 to transmit the separately generated uplink control information solely over a primary PUCCH resource (or solely over a secondary PUCCH resource) based on receiving control signaling that activates this reporting mode.

In some examples, UE 315 may determine the mode for reporting based on information obtained or determined by UE 315. In some cases, UE 315 determines which reporting mode to activate based on channel qualities measured by UE 315 for the primary and secondary cells, a transmission power calculation performed by UE 315, a priority associated with separate uplink control information generated by UE 315, a payload size and/or code rate of the separate uplink control information generated by UE 315, whether a timing for reporting first uplink control information generated by UE 315 overlaps with a timing for reporting second uplink control information generated by UE 315, whether a PUCCH secondary cell carries a PUSCH for UE 315, whether PUSCH resources scheduled for UE 315 on the PUCCH secondary cell overlap with PUCCH resources that may be scheduled for UE 315 on the PUCCH secondary cell, or any combination thereof, as discussed herein and with reference to FIG. 2.

In some examples, when base station 305 transmits using first TRP 320 and second TRP 325, UE 315 may also consider whether PUSCH resources for UE 315 are scheduled on the primary cell and/or the PUCCH secondary cell, whether primary PUCCH resources that may be scheduled for UE 315 are overlapping with secondary PUCCH resources that may be scheduled for UE 315, or both, when determining which reporting mode to activate.

At block 370, UE 315 may identify PUCCH resources for transmitting the separately generated uplink control information based on the determined reporting mode. In some examples, after determining to activate a reporting mode triggering UE 315 to transmit the separately generated uplink control information over respective primary and secondary PUCCH resources, UE 315 may identify a primary PUCCH resource and a secondary PUCCH resource. In some examples, after determining to activate a reporting mode triggering UE 315 to transmit the separately generated uplink control information over solely a primary PUCCH resource, UE 315 may identify the primary PUCCH resource. In some examples, UE 315 may identify a first primary PUCCH resource for transmitting uplink control information for the first set of component carriers and a second primary PUCCH resource for transmitting uplink control information for the second set of component carriers—e.g., if the subcarrier spacings for the first and second set of component carriers are different. In some examples, before determining to activate a reporting mode triggering UE 315 to transmit the separately generated uplink control information over solely a primary PUCCH resource, UE 315 may identify both primary and secondary PUCCH resources.

In some examples, UE 315 may identify a primary PUCCH resource for transmitting the separately generated uplink control information based on a first set of DCI messages received over a first set of component carriers and a second set of DCI message received over a second set of component carriers. For example, UE 315 may identify the primary PUCCH resource relative to the last DCI message received of the first and second set of DCI messages—e.g., the primary PUCCH resource may occur K slots after the last DCI message.

At arrow 375, UE 315 may transmit the separately generated uplink control information to base station 305 using the identified PUCCH resources. In some examples, UE 315 transmits the separately generated uplink control information over a primary PUCCH resource on a primary cell—e.g., when the corresponding reporting mode is activated at UE 315. In some cases, UE 315 may also transmit to base station 305 an indication of which reporting mode is activated at UE 315.

In some cases, when UE 315 identifies a single PUCCH resource for transmitting uplink control information, UE 315 multiplexes the separately generated uplink control information together within the single PUCCH resource—e.g., into a single uplink control information message. That is, UE 315 may use a first set of time and frequency resources for first uplink control information and a second set of time and frequency resources for second uplink control information. In some examples, the time resources or the frequency resources for the different uplink control information may be non-overlapping. In some examples, the time and frequency resources for the different uplink control information may be overlapping—e.g., the time and frequency resource for the different uplink control information may be interspersed.

At arrow 380, base station 305 may transmit additional data to UE 315 over the activated component carriers. In some examples, base station 305 may also transmit additional control signaling to UE 315—e.g., control signaling indicating that a new mode for reporting uplink control information is to be used by UE 315.

At block 385, UE 315 may perform a procedure for determining how to report uplink control information for the additional data received by UE 315. In some examples, UE 315 may use the same reporting mode that was used for the data received at arrow 355. In some examples, UE 315 may determine that a different reporting mode is to be used for the data received at arrow 380. In some examples, UE 315 determines that a different reporting mode is to be used based on receiving signaling from base station 305 that indicates the same. In some examples, UE 315 determines on its own that a different reporting mode is to be used based on measurements taken or information obtained by UE 315 and rules stored at UE 315 for determining which reporting mode to use. In some examples, UE 315 determines that a different reporting mode is to be used and switches from the reporting mode that was determined at block 365 to the different reporting mode. For example, UE 315 may determine to activate a reporting mode that triggers UE 315 to transmit separately generated uplink control information over respective primary and secondary PUCCH resources. After determining the reporting mode, UE 315 may identify corresponding PUCCH resources for transmitting the separately generated uplink control information.

At arrow 390, UE 315 may transmit the separately generated uplink control information to base station 305. In some examples, transmitting the separately generated uplink control information includes transmitting first uplink control information (generated for a first set of component carriers and/or a first TRP) over a primary PUCCH resource and transmitting second uplink control information (generated for a second set of component carriers and/or a second TRP) over a secondary PUCCH resource.

In some cases, UE 315 may continue to receive communications from base station 305 and may continue to switch between reporting uplink control information over one primary PUCCH resource or over respective primary and secondary PUCCH resources when multiple PUCCH groups are configured.

Figure 4:
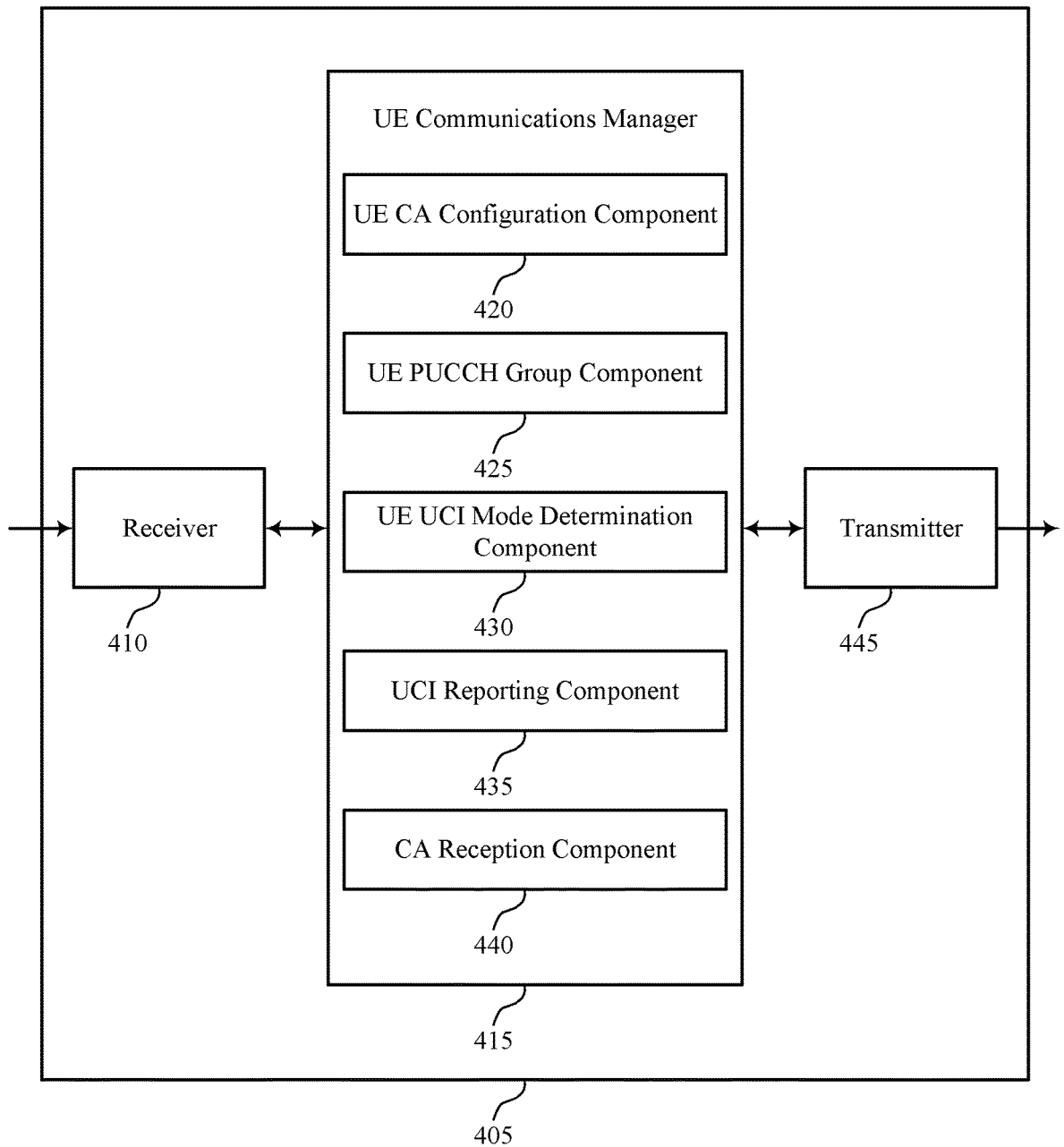
FIG. 4 shows a block diagram of a device that supports techniques for selecting an uplink control information reporting mode in accordance with various aspects of the present disclosure.

FIG. 4 shows a block diagram of a device that supports techniques for selecting an uplink control information reporting mode in accordance with various aspects of the present disclosure. A block diagram 400 may illustrate aspects of a device 405. The device 405 may be an example of aspects of a UE 115 as described herein. The device 405 may include a receiver 410, a UE communications manager 415, and a transmitter 445. The device 405 may also include a processor. Each of these components may be in communication with one another (e.g., via one or more buses).

The receiver 410 may receive information such as packets, user data, or control information associated with various information channels (e.g., control channels, data channels, and information related to techniques for selecting an uplink control information reporting mode, etc.). Information may be passed on to other components of the device 405. The receiver 410 may be an example of aspects of the transceiver 620 described with reference to FIG. 6. The receiver 410 may utilize a single antenna or a set of antennas.

The UE communications manager 415 may include a UE CA configuration component 420, a PUCCH group component 425, an UCI mode determination component 430, an UCI reporting component 435, and a CA reception component 440. The UE communications manager 415 may be an example of aspects of the UE communications manager 610 described herein.

The UE CA configuration component 420 may identify a first set of component carriers associated with a first group of serving cells and a second set of component carriers associated with a second group of serving cells.

The PUCCH group component 425 may identify a first serving cell of the first group of serving cells as being configured with uplink control resources for reporting uplink control information for the first set of component carriers and identify a second serving cell of the second group of serving cells as being configured with uplink control resources for reporting uplink control information for the second set of component carriers based on the identified first set of component carriers and the second set of component carriers.

The UCI mode determination component 430 may select a mode for reporting uplink control information for the first set of component carriers and the second set of component carriers based on the first serving cell and the second serving cell.

The UCI reporting component 435 may transmit first uplink control information for the first set of component carriers and second uplink control information for the second set of component carriers using first uplink control resources of the first serving cell based on the selected mode.

In some cases, communications from multiple TRPs and having separate DCI messages may be configured for communications to device 405.

The CA reception component 440 may receive a first communication from a first transmission point and a second communication from a second transmission point.

The PUCCH group component 425 may identify a first serving cell of a first group of serving cells as being configured with uplink control resources for reporting uplink control information for the first transmission point and identify a second serving cell of a second group of serving cells as being configured with uplink control resources for reporting uplink control information for the second transmission point.

The UCI mode determination component 430 may determine that uplink control information for the first transmission point and uplink control information for the second transmission point is to be reported on the first serving cell based on the first serving cell and the second serving cell.

The UCI reporting component 435 may transmit first uplink control information for the first transmission point and second uplink control information for the second transmission point using the uplink control resources of the first serving cell based on the selecting.

The transmitter 445 may transmit signals generated by other components of the device 405. In some examples, the transmitter 445 may be collocated with a receiver 410 in a transceiver module. For example, the transmitter 445 may be an example of aspects of the transceiver 620 described with reference to FIG. 6. The transmitter 445 may utilize a single antenna or a set of antennas.

Figure 5:
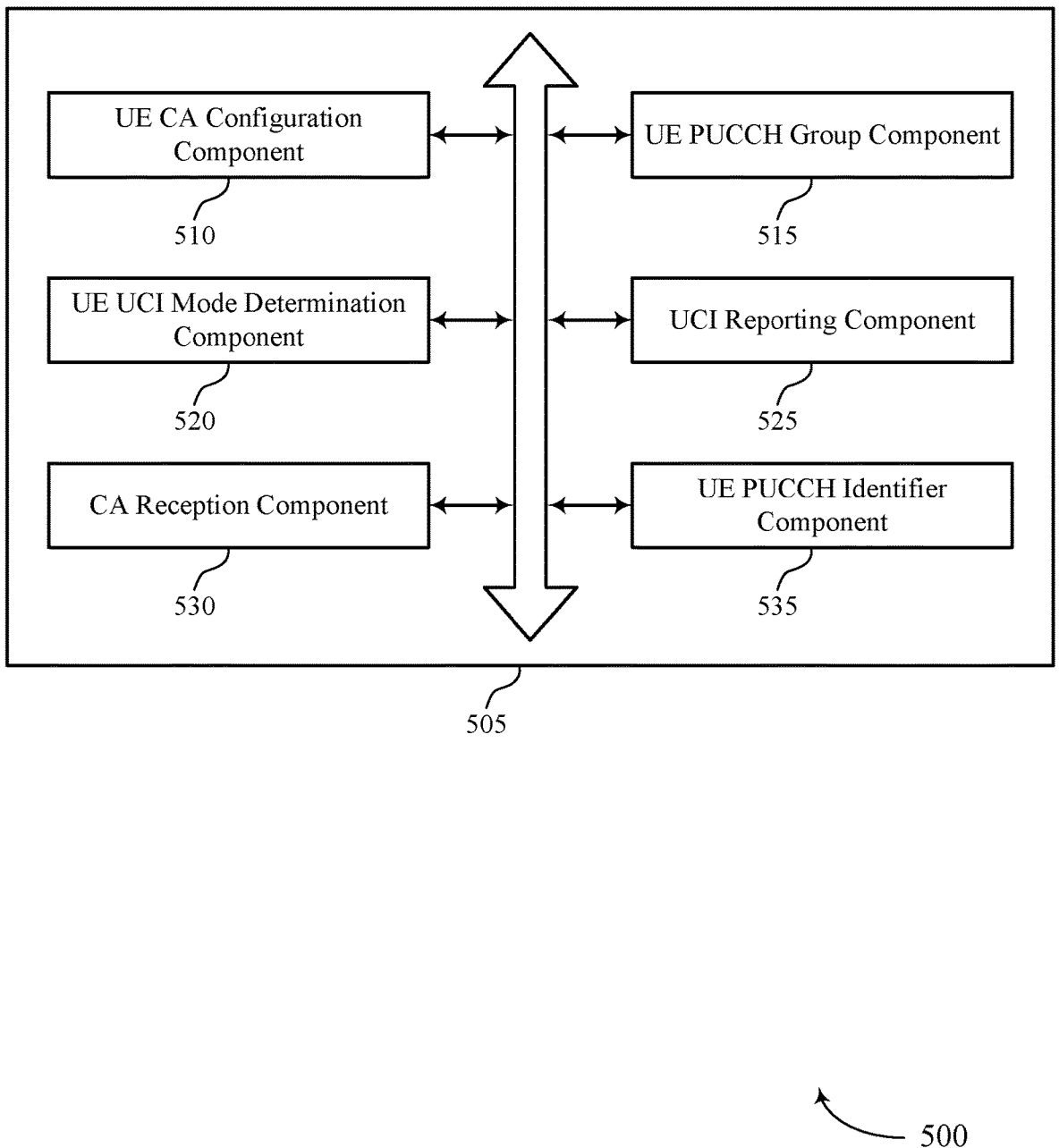
FIG. 5 shows a block diagram of a UE communications manager that supports techniques for selecting an uplink control information reporting mode in accordance with various aspects of the present disclosure.

FIG. 5 shows a block diagram of a UE communications manager that supports techniques for selecting an uplink control information reporting mode in accordance with various aspects of the present disclosure. A block diagram 500 may illustrate aspects of a UE communications manager 505. The UE communications manager 505 may be an example of aspects of a UE communications manager 415 described herein. The UE communications manager 505 may include a UE CA configuration component 510, a UE PUCCH group component 515, a UE UCI mode determination component 520, an UCI reporting component 525, a CA reception component 530, and a UE PUCCH identifier component 535. Each of these modules may communicate, directly or indirectly, with one another (e.g., via one or more buses).

The UE CA configuration component 510 may identify a first set of component carriers associated with a first group of serving cells and a second set of component carriers associated with a second group of serving cells.

The UE PUCCH group component 515 may identify a first serving cell of the first group of serving cells as being configured with uplink control resources for reporting uplink control information for the first set of component carriers and identify a second serving cell of the second group of serving cells as being configured with uplink control resources for reporting uplink control information for the second set of component carriers based on the identified first set of component carriers and the second set of component carriers. In some cases, the uplink control information comprises a hybrid automatic repeat request codebook, a channel state information report, a scheduling request, or any combination thereof.

The CA reception component 530 may receive a first set of communications over the first set of component carriers and a second set of communications over the second set of component carriers. In some cases, the CA reception component 530 may receive a first set of DCI messages over the first set of component carriers and a second set of DCI messages over the second set of component carriers.

The UE PUCCH identifier component 535 may identify a location of the first uplink control resources based on the first set of DCI messages and the second set of DCI messages. In some cases, the location of the first uplink control resources comprises is identified relative to a last received DCI message of the received first set of DCI messages and the received second set of DCI messages that is received. In some cases, the first uplink control resources comprise a first set of uplink control resources for the first set of component carriers and a second set of uplink control resources for the second set of component carriers that are non-overlapping in time with the first set of uplink control resources.

The UE UCI mode determination component 520 may select a mode for reporting uplink control information for the first set of component carriers and the second set of component carriers based on the first serving cell and the second serving cell.

The UCI reporting component 525 may transmit first uplink control information for the first set of component carriers and second uplink control information for the second set of component carriers using first uplink control resources of the first serving cell based on the selected mode. The UCI reporting component 525 may transmit, to a base station, an indication of the selected mode.

In some cases, the UCI reporting component 525 may generate, based on the first set of communications and the second set of communications, the first uplink control information for the first set of component carriers and the second uplink control information for the second set of component carriers. In some cases, the second uplink control information may be generated separately from the first uplink control information. In some cases, the UCI reporting component 525 may multiplex the first uplink control information for the first set of component carriers with the second uplink control information for the second set of component carriers based on the selected mode.

In some cases, the UCI reporting component 525 may receive, from a base station, control signaling indicating that uplink control information for the first set of component carriers and that uplink control information for the second set of component carriers is to be reported using uplink control resources of the first serving cell, where the mode for reporting uplink control information may be selected based on the received control signaling. In some cases, the control signaling includes a radio resource control message for configuring the mode for reporting uplink control information, a downlink control information message comprising an indication first activating the mode for reporting uplink control information, a medium access control-control element that activate the mode for reporting uplink control information, or any combination thereof.

In some cases, the UCI reporting component 525 may determine that uplink control information for the first set of component carriers and that uplink control information for the second set of component carriers is to be reported using uplink control resources of the first serving cell, where the mode for reporting uplink control information may be selected based on the received control signaling. In some cases, the determining is based on a first priority of the first uplink control information and a second priority of the second uplink control information. In some cases, the determining is based on a first payload size of the first uplink control information and a second payload size of the second uplink control information. In some cases, the determining is based on a first code rate of the first uplink control information and a second code rate of the second uplink control information.

In some cases, the determining is based on a measurement of first channel conditions for the first serving cell and of second channel conditions for the second serving cell. In some cases, the determining is based on a calculation of transmission power for simultaneously transmitting uplink control information over both the first serving cell and the second serving cell. In some cases, the determining is based on an overlap in time of uplink control resources of the first serving cell with uplink control resources of the second serving cell. In some cases, the determining is based on a scheduling of uplink data resources on the second serving cell. In some cases, the determining is further based on the scheduled uplink data resources overlapping in time with uplink control resources of the second serving cell.

In some cases, the UE UCI mode determination component 520 may select, after transmitting the first uplink control information and the second uplink control information, a different mode for reporting uplink control information for the first set of component carriers and the second set of component carriers. In such cases, the UCI reporting component 525 may transmit third uplink control information for the first set of component carriers using second uplink control resources of the first serving cell and fourth uplink control information for the second set of component carriers using third uplink control resources of the second serving cell based on the different mode.

In some cases, the UE UCI mode determination component 520 may select, before selecting the mode for reporting, a different mode for reporting uplink control information for the first set of component carriers and the second set of component carriers based on the first serving cell and the second serving cell. In such cases, the UCI reporting component 525 may transmit. third uplink control information for the first set of component carriers using second uplink control resources of the first serving cell and fourth uplink control information for the second set of component carriers using third uplink control resources of the second serving cell based on the different mode. Also, the UE UCI mode determination component 520 may switch from the different mode to the selected mode after transmitting the third uplink control information and the fourth uplink control information.

In some cases, communications from multiple TRPs and having separate DCI messages may be configured for communications to a device including UE communications manager 505.

The CA reception component 530 may receive a first communication from a first transmission point and a second communication from a second transmission point. In some cases, the CA reception component 530 may receive a first set of communications from the first transmission point and a second set of communications from the second transmission point. In some cases, the CA reception component 530 may receive a first set of DCI messages from the first transmission point and a second set of DCI messages from the second transmission point.

The UE PUCCH group component 515 may identify a first serving cell of a first group of serving cells as being configured with uplink control resources for reporting uplink control information for the first transmission point and identify a second serving cell of a second group of serving cells as being configured with uplink control resources for reporting uplink control information for the second transmission point.

The UE PUCCH identifier component 535 may identify a location of the uplink control resources based on the first set of DCI messages and the second set of DCI messages.

The UE UCI mode determination component 520 may determine that uplink control information for the first transmission point and uplink control information for the second transmission point is to be reported on the first serving cell based on the first serving cell and the second serving cell. In some cases, the UE UCI mode determination component 520 may select a mode for reporting uplink control information for the first transmission point and the second transmission point based on the determining.

In some cases, the UE UCI mode determination component 520 may receive, from a base station, control signaling indicating that uplink control information for the first transmission point and that uplink control information for the second transmission point is to be reported using uplink control resources of the first serving cell, where the mode for reporting uplink control information is selected based on the received control signaling.

In some cases, the UE UCI mode determination component 520 may determine that uplink control information for the first transmission point and that uplink control information for the second transmission point is to be reported using uplink control resources of the first serving cell, where the mode for reporting uplink control information is selected based on the received control signaling. In some cases, the determining is based on a scheduling of uplink data resources for the first transmission point or the second transmission point on the second serving cell. In some cases, the determining is based on an overlap in time of uplink control resources of the first serving cell with uplink control resources of the second serving cell.

The UCI reporting component 525 may transmit first uplink control information for the first transmission point and second uplink control information for the second transmission point using the uplink control resources of the first serving cell based on the selecting.

In some cases, the UCI reporting component 525 may generate based on the first set of communications and the second set of communications, the first uplink control information for the first transmission point and the second uplink control information for the second transmission point, the second uplink control information being generated separately from the first uplink control information. In some cases, the UCI reporting component 525 may multiplex the first uplink control information from the first transmission point with the second uplink control information for the second transmission point based on the selected mode.

Figure 6:
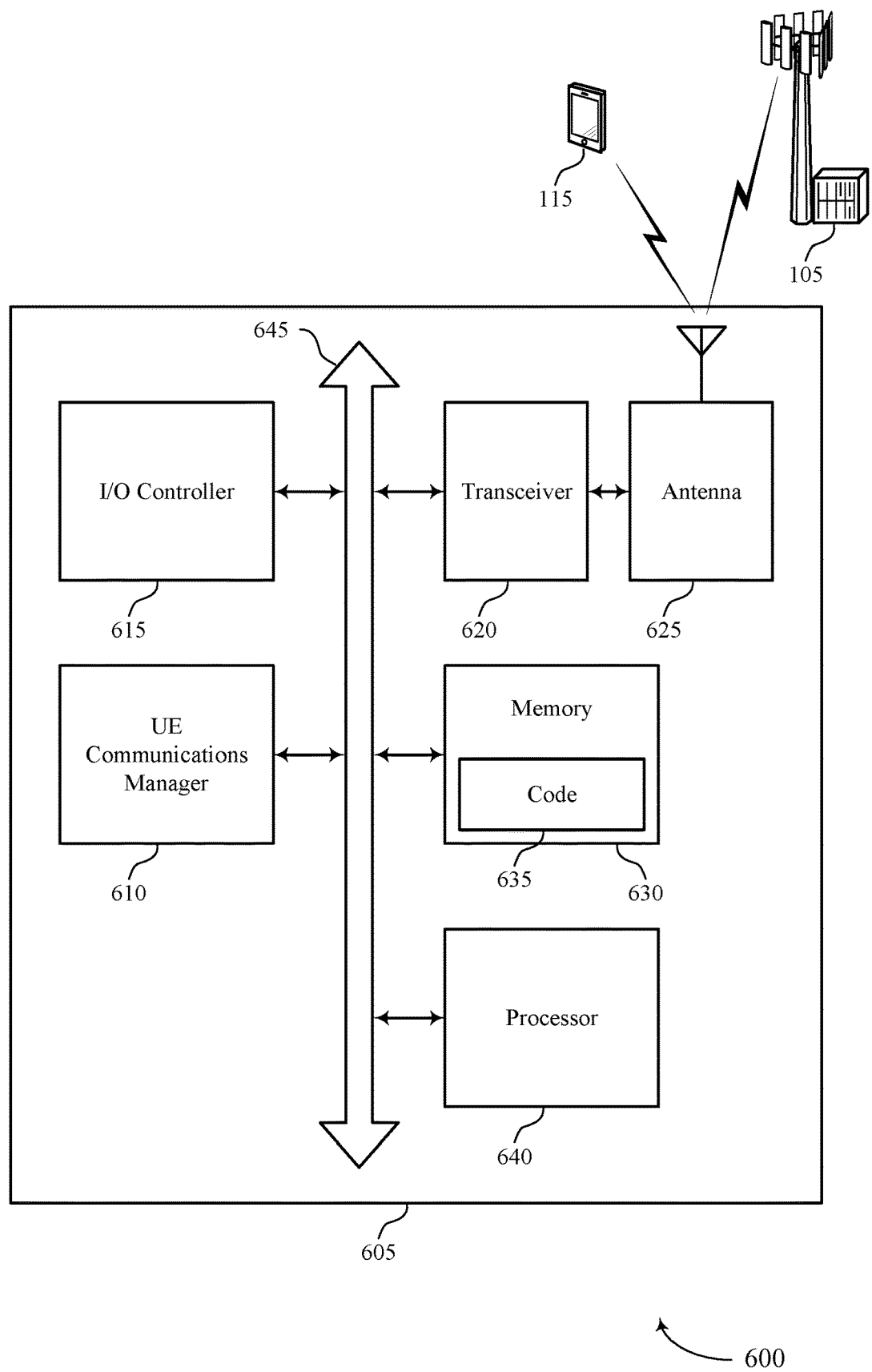
FIG. 6 shows a diagram of a system including a device that supports techniques for selecting an uplink control information reporting mode in accordance with various aspects of the present disclosure.

FIG. 6 shows a diagram of a system including a device that supports techniques for selecting an uplink control information reporting mode in accordance with various aspects of the present disclosure. A system 600 may include a device 605. The device 605 may be an example of or include the components of device 405 or a UE 115 as described herein. The device 605 may include components for bi-directional voice and data communications including components for transmitting and receiving communications, including a UE communications manager 610, an I/O controller 615, a transceiver 620, an antenna 625, memory 630, and a processor 640. These components may be in electronic communication via one or more buses (e.g., bus 645).

The UE communications manager 610 be an example of a UE communications manager 415 or a UE communications manager 505 as described herein.

The I/O controller 615 may manage input and output signals for the device 605. The I/O controller 615 may also manage peripherals not integrated into the device 605. In some cases, the I/O controller 615 may represent a physical connection or port to an external peripheral. In some cases, the I/O controller 615 may utilize an operating system such as iOS®, ANDROID®, MS-DOS®, MS-WINDOWS®, OS/2®, UNIX®, LINUX®, or another known operating system. In other cases, the I/O controller 615 may represent or interact with a modem, a keyboard, a mouse, a touchscreen, or a similar device. In some cases, the I/O controller 615 may be implemented as part of a processor. In some cases, a user may interact with the device 605 via the I/O controller 615 or via hardware components controlled by the I/O controller 615.

The transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas.

In some cases, the wireless device may include an antenna 625. However, in some cases the device may have more than one antenna, which may be capable of concurrently transmitting or receiving multiple wireless transmissions.

The memory 630 may include random-access memory (RAM) and read-only memory (ROM). The memory 630 may store code 635 that is computer-readable and computer-executable and that includes instructions that, when executed, cause the processor to perform various functions described herein. In some cases, the memory 630 may contain, among other things, a basic input/output system (BIOS) which may control basic hardware or software operation such as the interaction with peripheral components or devices.

The processor 640 may include an intelligent hardware device, (e.g., a general-purpose processor, a digital systems processor (DSP), a CPU, a microcontroller, an ASIC, a field-programmable gate array (FPGA), a programmable logic device, a discrete gate or transistor logic component, a discrete hardware component, or any combination thereof). In some cases, the processor 640 may be configured to operate a memory array using a memory controller. In other cases, a memory controller may be integrated into the processor 640. The processor 640 may be configured to execute computer-readable instructions stored in a memory (e.g., the memory 630) to cause the device 605 to perform various functions (e.g., functions or tasks supporting techniques for selecting an uplink control information reporting mode).

The code 635 may include instructions to implement aspects of the present disclosure, including instructions to support wireless communications. The code 635 may be stored in a non-transitory computer-readable medium such as system memory or other type of memory. In some cases, the code 635 may not be directly executable by the processor 640 but may cause a computer (e.g., when compiled and executed) to perform functions described herein.

Figure 7:
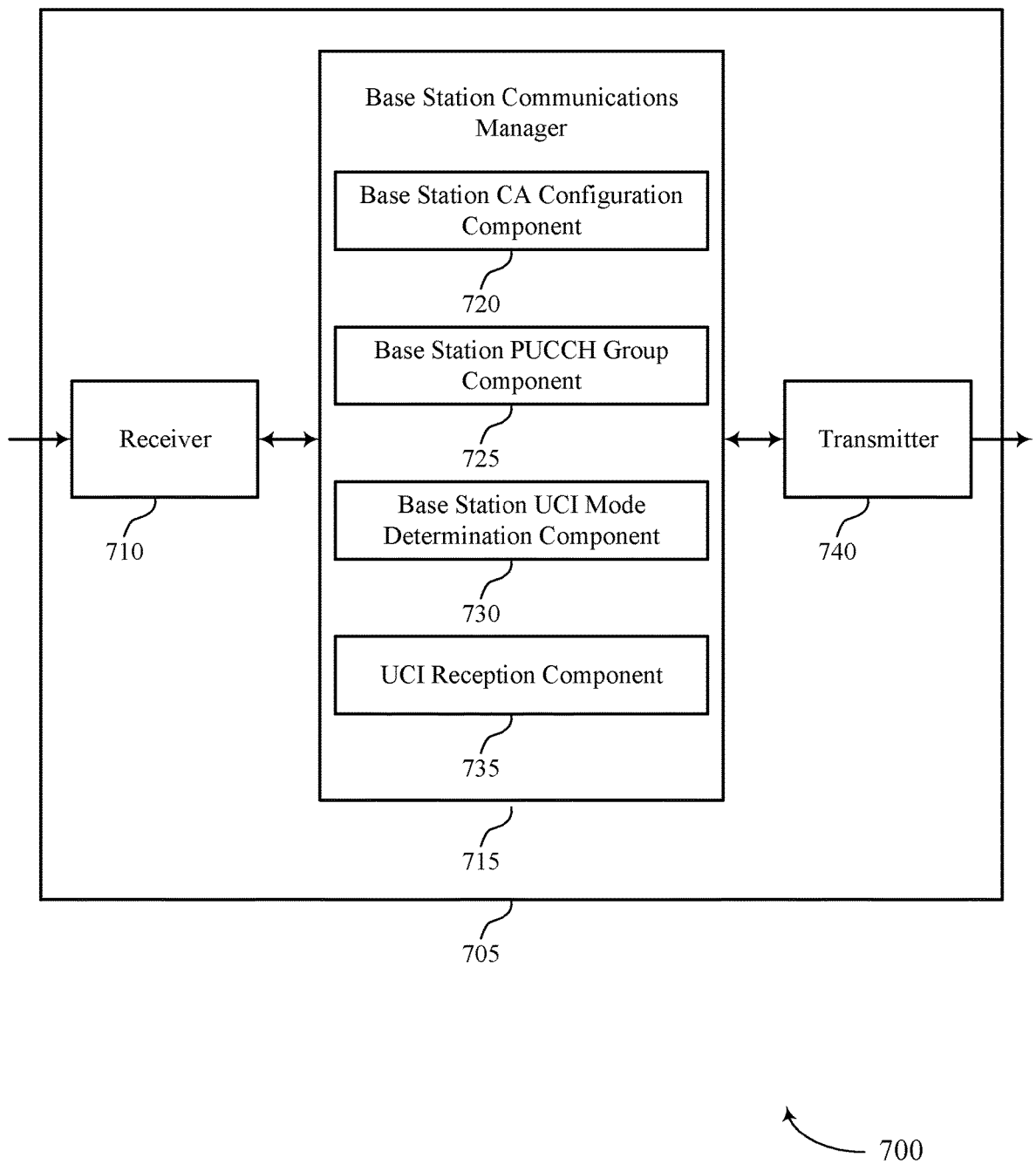
FIG. 7 shows a block diagram of a device that support techniques for selecting an uplink control information reporting mode in accordance with various aspects of the present disclosure.

FIG. 7 shows a block diagram of a device that supports techniques for selecting an uplink control information reporting mode in accordance with various aspects of the present disclosure. A block diagram 700 may illustrate aspects of a device 705. The device 705 may be an example of aspects of a base station 105 as described herein. The device 705 may include a receiver 710, a base station communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to techniques for selecting an uplink control information reporting mode, etc.). Information may be passed on to other components of the device 705. The receiver 710 may be an example of aspects of the transceiver 920 described with reference to FIG. 9. The receiver 710 may utilize a single antenna or a set of antennas.

The base station communications manager 715 may include a base station CA configuration component 720, a base station PUCCH group component 725, a base station UCI mode determination component 730, and an UCI reception component 735.

The base station CA configuration component 720 may activate a first set of component carriers that is associated with a first group of serving cells and a second set of component carriers that is associated with a second group of serving cells.

The base station PUCCH group component 725 may configure a first serving cell of the first group of serving cells with uplink control resources for reporting uplink control information for the first set of component carriers and configure a second serving cell of the second group of serving cells with uplink control resources for reporting uplink control information for the second set of component carriers based on the activating.

The base station UCI mode determination component 730 may select a mode for reporting uplink control information for the first set of component carriers and the second set of component carriers based on the first serving cell and the second serving cell.

The UCI reception component 735 may receive first uplink control information for the first set of component carriers and second uplink control information for the second set of component carriers using the uplink control resources of the first serving cell based on the selecting.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
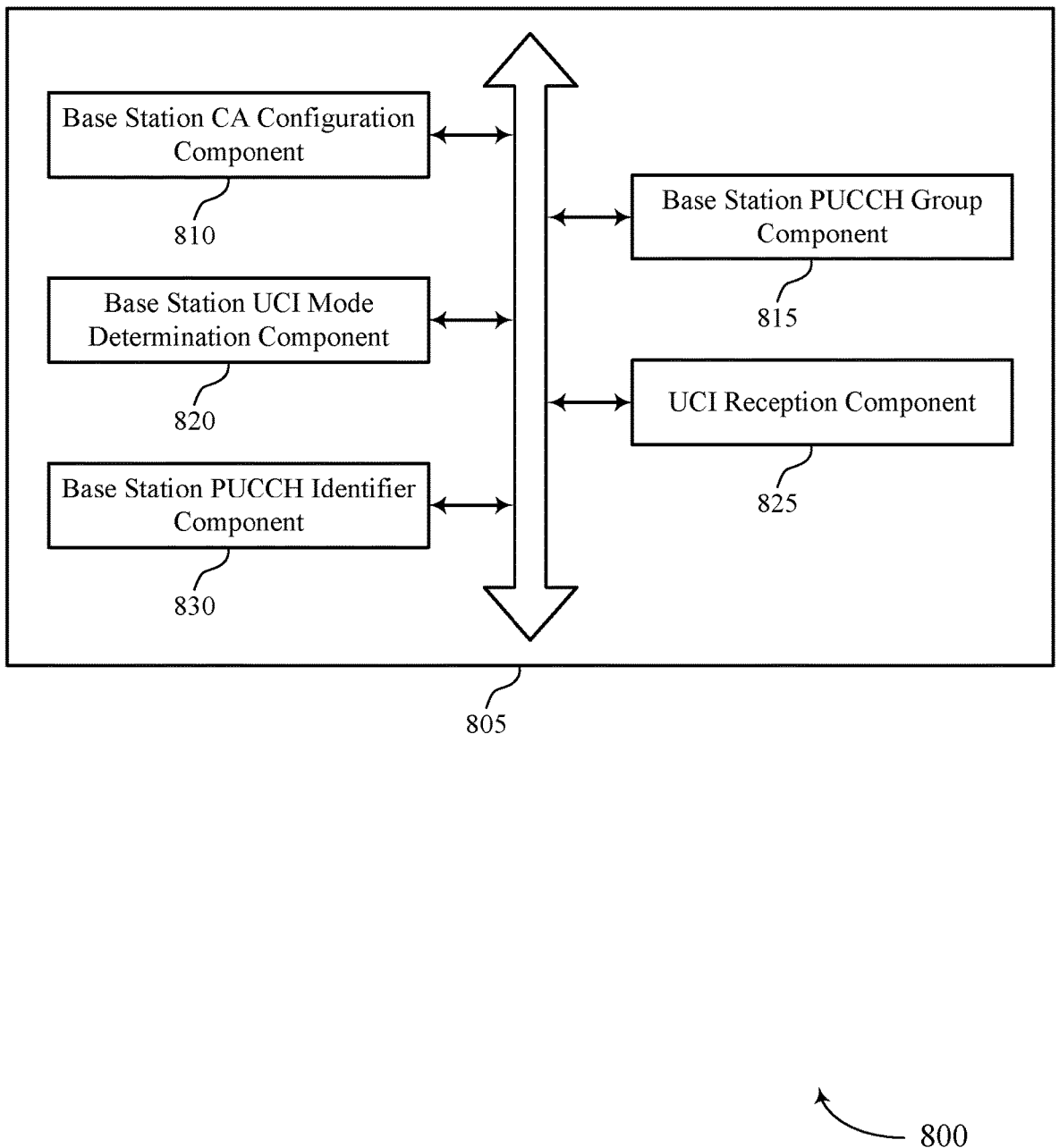
FIG. 8 shows a block diagram of a base station communications manager that supports techniques for selecting an uplink control information reporting mode in accordance with various aspects of the present disclosure.

FIG. 8 shows a block diagram of a base station communications manager that supports techniques for selecting an uplink control information reporting mode in accordance with various aspects of the present disclosure. A block diagram 800 may illustrate aspects of a base station communications manager 805. The base station communications manager 805 may be an example of aspects of a base station communications manager 715 described herein. The base station communications manager 805 may include a base station CA configuration component 810, a base station PUCCH group component 815, a base station UCI mode determination component 820, an UCI reception component 825, and a base station PUCCH identifier component 830. Each of these modules may communicate, directly or indirectly, with one another (e.g., via one or more buses).

The base station CA configuration component 810 may activate a first set of component carriers that is associated with a first group of serving cells and a second set of component carriers that is associated with a second group of serving cells.

The base station PUCCH group component 815 may configure a first serving cell of the first group of serving cells with uplink control resources for reporting uplink control information for the first set of component carriers and configure a second serving cell of the second group of serving cells with uplink control resources for reporting uplink control information for the second set of component carriers based on the activating.

The base station UCI mode determination component 820 may select a mode for reporting uplink control information for the first set of component carriers and the second set of component carriers based on the first serving cell and the second serving cell. In some cases, the base station UCI mode determination component 820 may determine that uplink control information for the first set of component carriers and that uplink control information for the second set of component carriers is to be reported using uplink control resources of the first serving cell. In some cases, the determining is based on a measurement of first channel conditions for the first serving cell and of second channel conditions for the second serving cell. In some cases, the determining is based on a calculation of transmission power for simultaneously transmitting uplink control information over both the first serving cell and the second serving cell. In some cases, the determining is based on a first priority of the first uplink control information and a second priority of the second uplink control information. In some cases, the determining is based on a first payload size of the first uplink control information and a second payload size of the second uplink control information. In some cases, the determining is based on a first code rate of the first uplink control information and a second code rate of the second uplink control information. In some cases, the determining is based on an overlap in time of uplink control resources of the first serving cell with uplink control resources of the second serving cell. In some cases, the determining is based on a scheduling of uplink data resources on the second serving cell.

In some cases, the base station UCI mode determination component 820 may transmitting, to a user equipment, control signaling indicating the mode for reporting uplink control information. In some cases, the control signaling includes a radio resource control message, a downlink control information message, a medium access control-control element, or any combination thereof.

The base station PUCCH identifier component 830 may schedule the uplink control resources of the first serving cell based on the selected mode.

The UCI reception component 825 may receive first uplink control information for the first set of component carriers and second uplink control information for the second set of component carriers using the uplink control resources of the first serving cell based on the selecting. In some cases, the received first uplink control information is multiplexed with the received second uplink control information.

Figure 9:
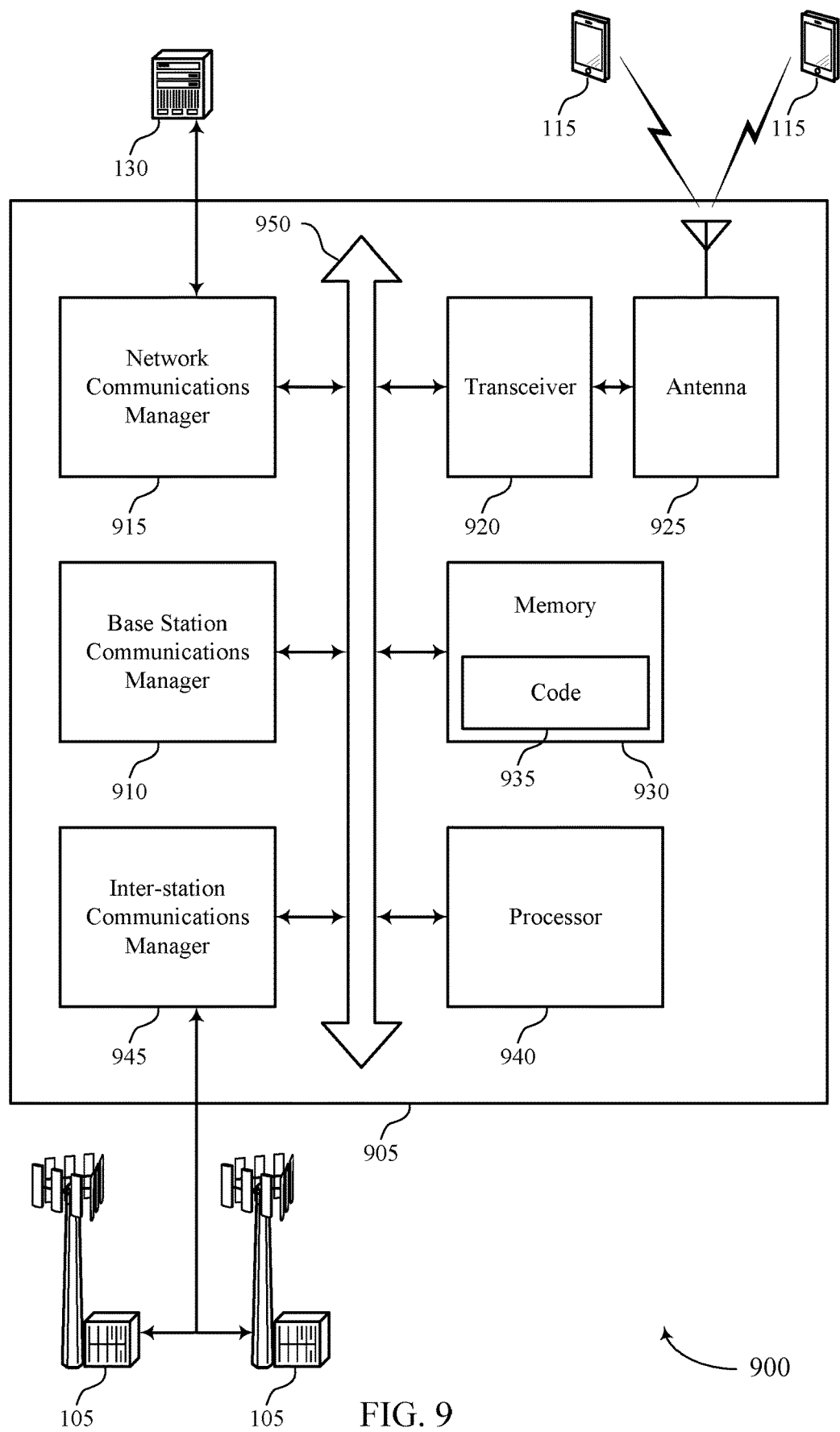
FIG. 9 shows a diagram of a system including a device that supports techniques for selecting an uplink control information reporting mode in accordance with various aspects of the present disclosure.

FIG. 9 shows a diagram of a system including a device that supports techniques for selecting an uplink control information reporting mode in accordance with various aspects of the present disclosure. A system 900 may include a device 905. The device 905 may be an example of or include the components of device 705 or a base station 105 as described herein. The device 905 may include components for bi-directional voice and data communications including components for transmitting and receiving communications, including a base station communications manager 910, a network communications manager 915, a transceiver 920, an antenna 925, memory 930, a processor 940, and an inter-station communications manager 945. These components may be in electronic communication via one or more buses (e.g., bus 950).

The base station communications manager 910 may be an example of a base station communications manager 715 or a base station communications manager 805 described herein.

The network communications manager 915 may manage communications with the core network (e.g., via one or more wired backhaul links). For example, the network communications manager 915 may manage the transfer of data communications for client devices, such as one or more UEs 115.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include an antenna 925. However, in some cases the device may have more than one antenna, which may be capable of concurrently transmitting or receiving multiple wireless transmissions.

The memory 930 may include RAM, ROM, or a combination thereof. The memory 930 may store code 935 that is computer-readable and includes instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some cases, a memory controller may be integrated into processor 940. The processor 940 may be configured to execute computer-readable instructions stored in a memory (e.g., the memory 930) to cause the device 905 to perform various functions (e.g., functions or tasks supporting techniques for selecting an uplink control information reporting mode).

The inter-station communications manager 945 may manage communications with other base station 105 and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
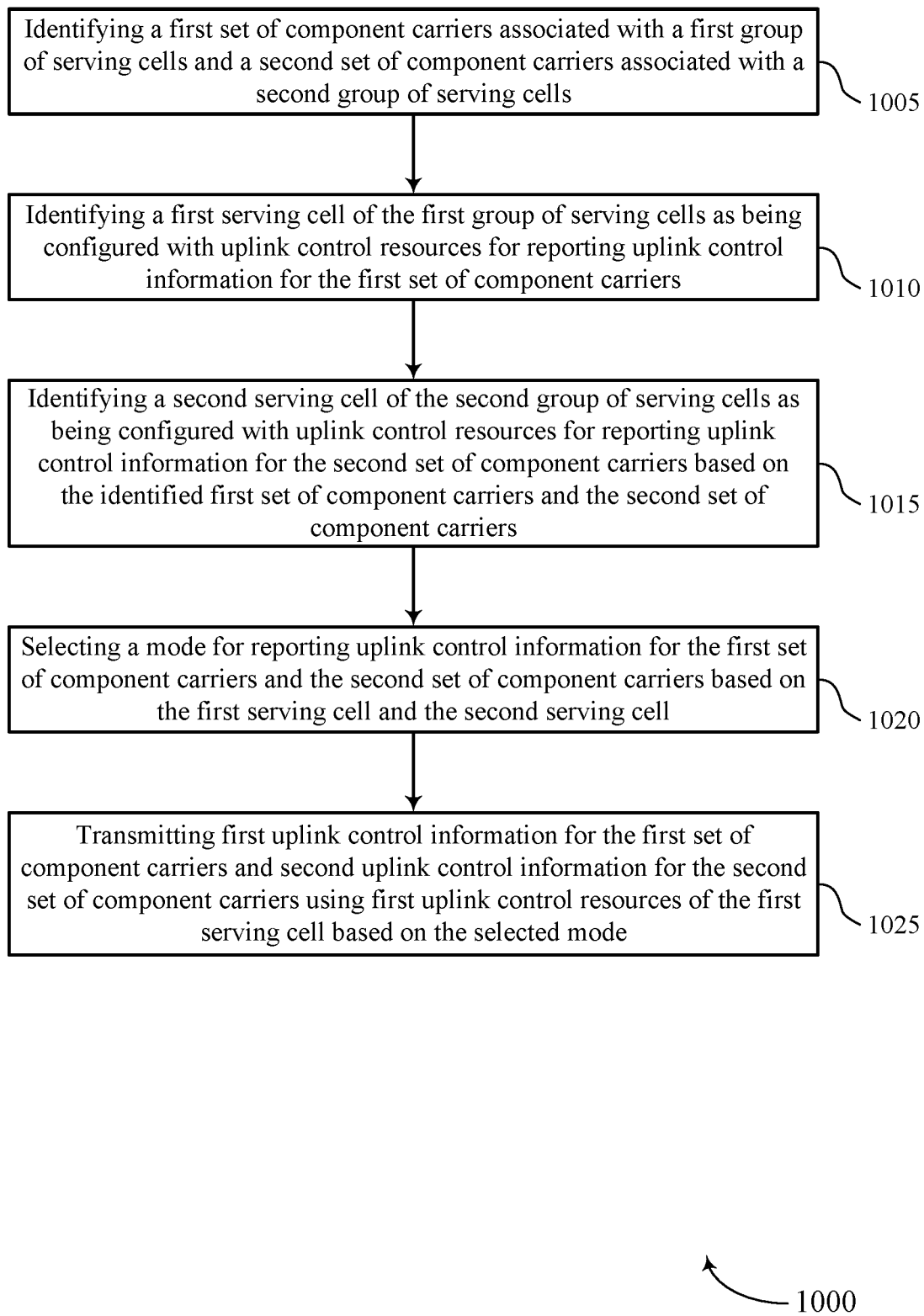
FIGS. 10 through 12 show flowcharts illustrating methods that support techniques for selecting an uplink control information reporting mode in accordance with various aspects of the present disclosure.

FIG. 10 shows a flowchart illustrating a method that supports techniques for selecting an uplink control information reporting mode in accordance with various aspects of the present disclosure. The operations of method 1000 may be implemented by a UE 115 or its components as described herein. For example, the operations of method 1000 may be performed by a communications manager as described with reference to FIGS. 5 and 6. In some examples, a UE may execute a set of instructions to control the functional elements of the UE to perform the functions described below. Additionally, or alternatively, a UE may perform aspects of the functions described below using special-purpose hardware.

At 1005, the UE may identify a first set of component carriers associated with a first group of serving cells and a second set of component carriers associated with a second group of serving cells. The operations of 1005 may be performed according to the methods described herein. In some examples, aspects of the operations of 1005 may be performed by a UE CA configuration component as described with reference to FIGS. 5 and 6.

At 1010, the UE may identify a first serving cell of the first group of serving cells as being configured with uplink control resources for reporting uplink control information for the first set of component carriers. The operations of 1010 may be performed according to the methods described herein. In some examples, aspects of the operations of 1010 may be performed by a PUCCH group component as described with reference to FIGS. 5 and 6.

At 1015, the UE may identify a second serving cell of the second group of serving cells as being configured with uplink control resources for reporting uplink control information for the second set of component carriers based on the identified first set of component carriers and the second set of component carriers. The operations of 1015 may be performed according to the methods described herein. In some examples, aspects of the operations of 1015 may be performed by a PUCCH group component as described with reference to FIGS. 5 and 6.

At 1020, the UE may select a mode for reporting uplink control information for the first set of component carriers and the second set of component carriers based on the first serving cell and the second serving cell. The operations of 1020 may be performed according to the methods described herein. In some examples, aspects of the operations of 1020 may be performed by an UCI mode determination component as described with reference to FIGS. 5 and 6.

At 1025, the UE may transmit first uplink control information for the first set of component carriers and second uplink control information for the second set of component carriers using first uplink control resources of the first serving cell based on the selected mode. The operations of 1025 may be performed according to the methods described herein. In some examples, aspects of the operations of 1025 may be performed by an UCI reporting component as described with reference to FIGS. 5 and 6.

Figure 11:
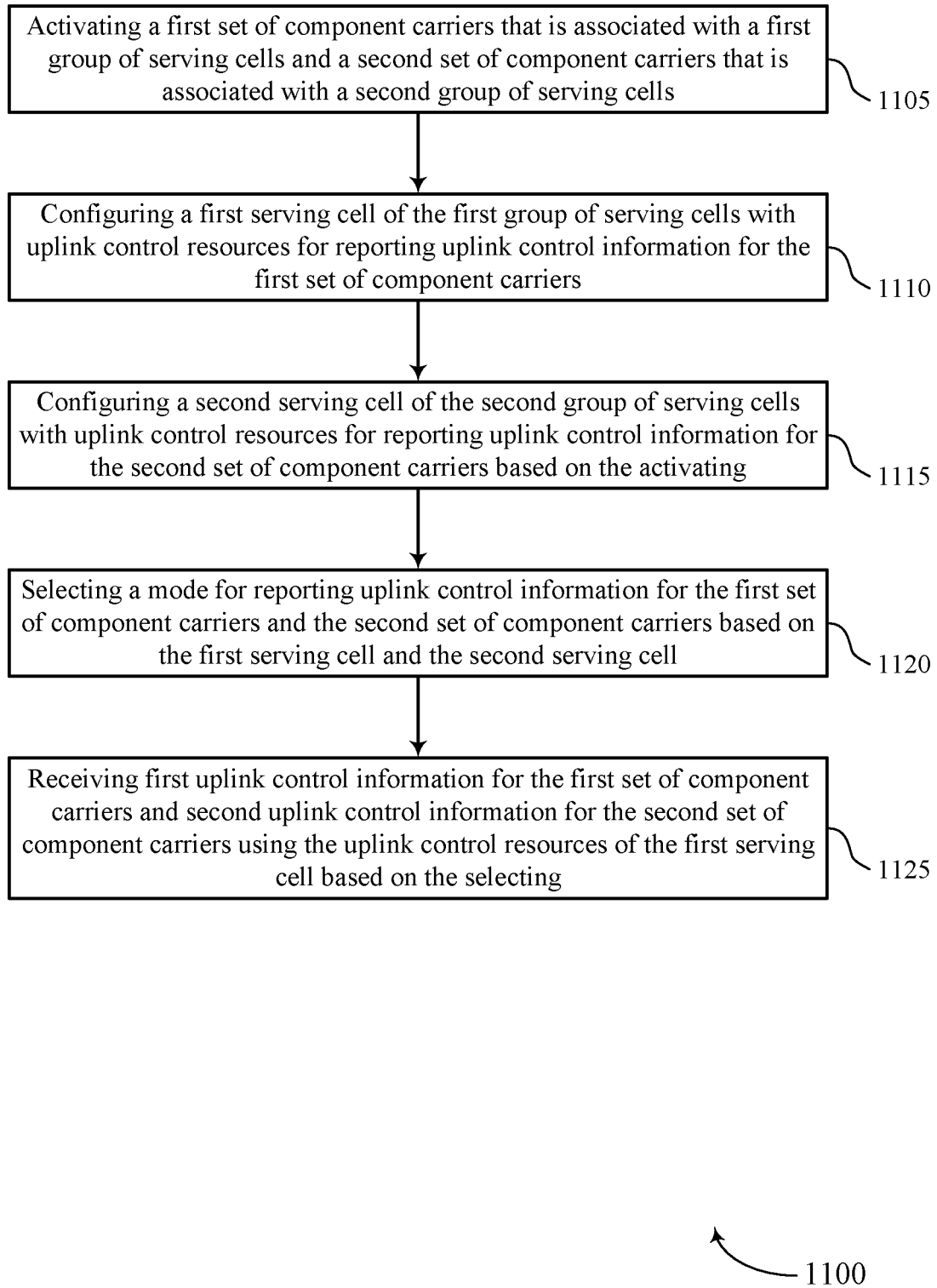

FIG. 11 shows a flowchart illustrating a method that supports techniques for selecting an uplink control information reporting mode in accordance with various aspects of the present disclosure. The operations of method 1100 may be implemented by a base station 105 or its components as described herein. For example, the operations of method 1100 may be performed by a communications manager as described with reference to FIGS. 8 and 9. In some examples, a base station may execute a set of instructions to control the functional elements of the base station to perform the functions described below. Additionally, or alternatively, a base station may perform aspects of the functions described below using special-purpose hardware.

At 1105, the base station may activate a first set of component carriers that is associated with a first group of serving cells and a second set of component carriers that is associated with a second group of serving cells. The operations of 1105 may be performed according to the methods described herein. In some examples, aspects of the operations of 1105 may be performed by a base station CA configuration component as described with reference to FIGS. 8 and 9.

At 1110, the base station may configure a first serving cell of the first group of serving cells with uplink control resources for reporting uplink control information for the first set of component carriers. The operations of 1110 may be performed according to the methods described herein. In some examples, aspects of the operations of 1110 may be performed by a PUCCH group component as described with reference to FIGS. 8 and 9.

At 1115, the base station may configure a second serving cell of the second group of serving cells with uplink control resources for reporting uplink control information for the second set of component carriers based on the activating. The operations of 1115 may be performed according to the methods described herein. In some examples, aspects of the operations of 1115 may be performed by a PUCCH group component as described with reference to FIGS. 8 and 9.

At 1120, the base station may select a mode for reporting uplink control information for the first set of component carriers and the second set of component carriers based on the first serving cell and the second serving cell. The operations of 1120 may be performed according to the methods described herein. In some examples, aspects of the operations of 1120 may be performed by an UCI mode determination component as described with reference to FIGS. 8 and 9.

At 1125, the base station may receive first uplink control information for the first set of component carriers and second uplink control information for the second set of component carriers using the uplink control resources of the first serving cell based on the selecting. The operations of 1125 may be performed according to the methods described herein. In some examples, aspects of the operations of 1125 may be performed by an UCI reception component as described with reference to FIGS. 8 and 9.

Figure 12:
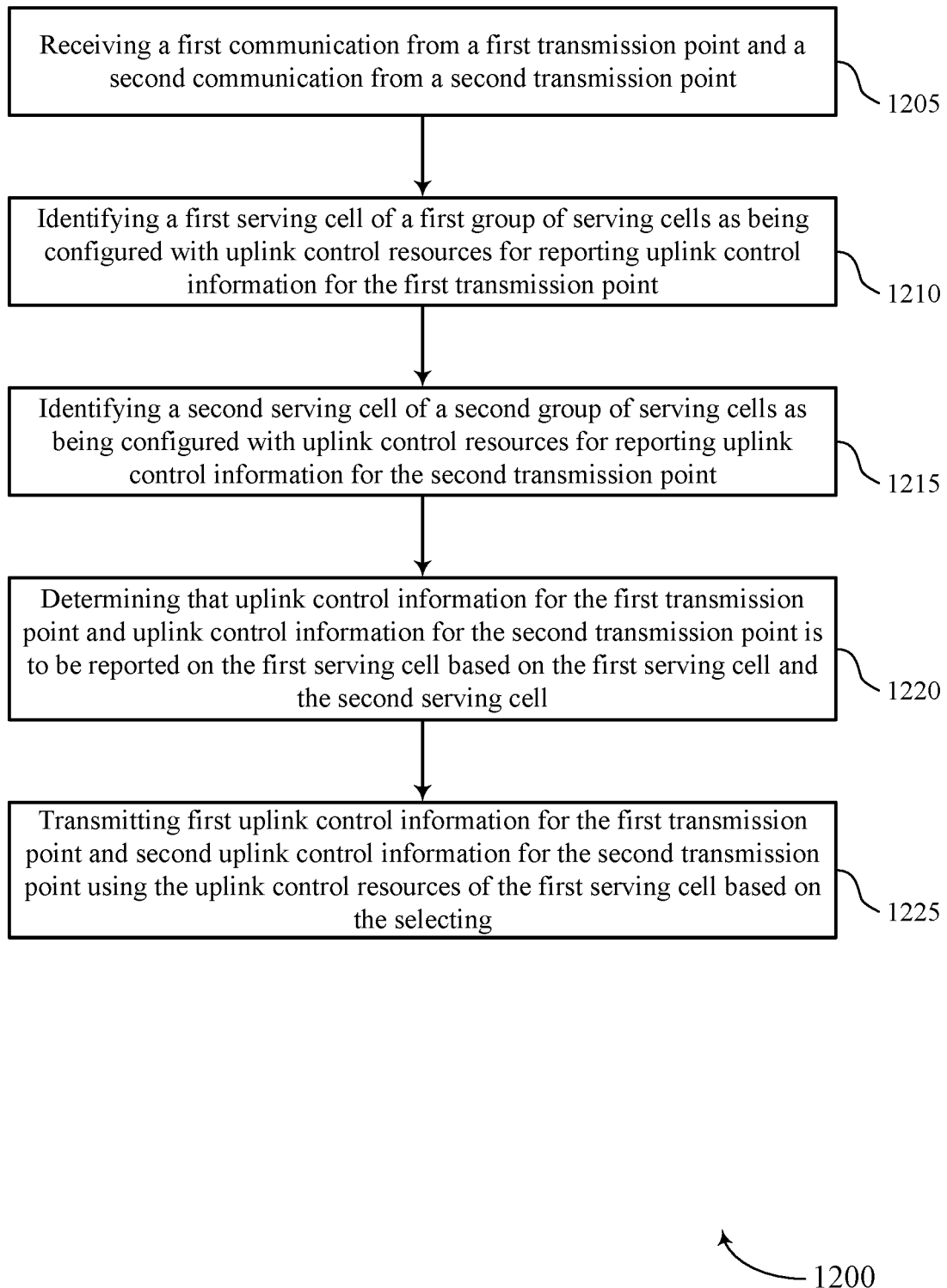

FIG. 12 shows a flowchart illustrating a method that supports techniques for selecting an uplink control information reporting mode in accordance with various aspects of the present disclosure. The operations of method 1200 may be implemented by a UE 115 or its components as described herein. For example, the operations of method 1200 may be performed by a communications manager as described with reference to FIGS. 5 and 6. In some examples, a UE may execute a set of instructions to control the functional elements of the UE to perform the functions described below. Additionally, or alternatively, a UE may perform aspects of the functions described below using special-purpose hardware.

At 1205, the UE may receive a first communication from a first transmission point and a second communication from a second transmission point. The operations of 1205 may be performed according to the methods described herein. In some examples, aspects of the operations of 1205 may be performed by a CA reception component as described with reference to FIGS. 5 and 6.

At 1210, the UE may identify a first serving cell of a first group of serving cells as being configured with uplink control resources for reporting uplink control information for the first transmission point. The operations of 1210 may be performed according to the methods described herein. In some examples, aspects of the operations of 1210 may be performed by a PUCCH group component as described with reference to FIGS. 5 and 6.

At 1215, the UE may identify a second serving cell of a second group of serving cells as being configured with uplink control resources for reporting uplink control information for the second transmission point. The operations of 1215 may be performed according to the methods described herein. In some examples, aspects of the operations of 1215 may be performed by a PUCCH group component as described with reference to FIGS. 5 and 6.

At 1220, the UE may determine that uplink control information for the first transmission point and uplink control information for the second transmission point is to be reported on the first serving cell based on the first serving cell and the second serving cell. The operations of 1220 may be performed according to the methods described herein. In some examples, aspects of the operations of 1220 may be performed by an UCI reporting component as described with reference to FIGS. 5 and 6.

At 1225, the UE may transmit first uplink control information for the first transmission point and second uplink control information for the second transmission point using the uplink control resources of the first serving cell based on the selecting. The operations of 1225 may be performed according to the methods described herein. In some examples, aspects of the operations of 1225 may be performed by an UCI reporting component as described with reference to FIGS. 5 and 6.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: identifying a first set of component carriers associated with a first group of serving cells and a second set of component carriers associated with a second group of serving cells; identifying a first serving cell of the first group of serving cells as being configured with uplink control resources for reporting uplink control information for the first set of component carriers; identifying a second serving cell of the second group of serving cells as being configured with uplink control resources for reporting uplink control information for the second set of component carriers based at least in part on the identified first set of component carriers and the second set of component carriers; selecting a mode for reporting uplink control information for the first set of component carriers and the second set of component carriers based at least in part on the first serving cell and the second serving cell; and transmitting first uplink control information for the first set of component carriers and second uplink control information for the second set of component carriers using first uplink control resources of the first serving cell based at least in part on the selected mode.

Aspect 2: The method of aspect 1, further comprising: selecting, before selecting the mode for reporting, a different mode for reporting uplink control information for the first set of component carriers and the second set of component carriers based at least in part on the first serving cell and the second serving cell; transmitting third uplink control information for the first set of component carriers using second uplink control resources of the first serving cell and fourth uplink control information for the second set of component carriers using third uplink control resources of the second serving cell based at least in part on the different mode; and switching from the different mode to the selected mode after transmitting the third uplink control information and the fourth uplink control information.

Aspect 3: The method of any of aspects 1 through 2, further comprising: receiving a first set of communications over the first set of component carriers and a second set of communications over the second set of component carriers; and generating, based at least in part on the first set of communications and the second set of communications, the first uplink control information for the first set of component carriers and the second uplink control information for the second set of component carriers, the second uplink control information being generated separately from the first uplink control information.

Aspect 4: The method of any of aspects 1 through 3, further comprising: receiving a first set of downlink control information messages over the first set of component carriers and a second set of downlink control information messages over the second set of component carriers; and identifying a location of the first uplink control resources based at least in part on the first set of downlink control information messages and the second set of downlink control information messages.

Aspect 5: The method of aspect 4, wherein the location of the first uplink control resources comprises is identified relative to a last received downlink control information message of the received first set of downlink control information messages and the received second set of downlink control information messages that is received.

Aspect 6: The method of any of aspects 4 through 5, wherein the location of the first uplink control resources comprises is identified relative to a last received first downlink control information message of the received first set of downlink control information messages and a last received second downlink control information message of the received second set of downlink control information messages that is received, the first uplink control resources comprise a first set of uplink control resources for the first set of component carriers and a second set of uplink control resources for the second set of component carriers that are non-overlapping in time with the first set of uplink control resources.

Aspect 7: The method of any of aspects 1 through 6, further comprising: multiplexing the first uplink control information for the first set of component carriers with the second uplink control information for the second set of component carriers based at least in part on the selected mode.

Aspect 8: The method of any of aspects 1 through 7, further comprising: receiving, from a base station, control signaling indicating that uplink control information for the first set of component carriers and that uplink control information for the second set of component carriers is to be reported using uplink control resources of the first serving cell, wherein the mode for reporting uplink control information is selected based at least in part on the received control signaling.

Aspect 9: The method of aspect 8, wherein the control signaling comprises: a radio resource control message for configuring the mode for reporting uplink control information; a downlink control information message comprising an indication first activating the mode for reporting uplink control information; a medium access control-control element that activate the mode for reporting uplink control information; or any combination thereof.

Aspect 10: The method of any of aspects 1 through 9, further comprising: determining that uplink control information for the first set of component carriers and that uplink control information for the second set of component carriers is to be reported using uplink control resources of the first serving cell, wherein the mode for reporting uplink control information is selected based at least in part on the received control signaling.

Aspect 11: The method of aspect 10, wherein the determining is based at least in part on a first priority of the first uplink control information and a second priority of the second uplink control information; a first payload size of the first uplink control information and a second payload size of the second uplink control information; a first code rate of the first uplink control information and a second code rate of the second uplink control information; or any combination thereof.

Aspect 12: The method of any of aspects 10 through 11, wherein the determining is based at least in part on a measurement of first channel conditions for the first serving cell and of second channel conditions for the second serving cell; a calculation of transmission power for simultaneously transmitting uplink control information over both the first serving cell and the second serving cell; or any combination thereof.

Aspect 13: The method of aspect 12, wherein the determining is based at least in part on the scheduled uplink data resources overlapping in time with uplink control resources of the second serving cell.

Aspect 14: The method of any of aspects 10 through 13, wherein the determining is based at least in part on an overlap in time of uplink control resources of the first serving cell with uplink control resources of the second serving cell; a scheduling of uplink data resources on the second serving cell; or any combination thereof.

Aspect 15: The method of any of aspects 1 through 14, further comprising: transmitting, to a base station, an indication of the selected mode.

Aspect 16: The method of any of aspects 1 through 15, further comprising: selecting, after transmitting the first uplink control information and the second uplink control information, a different mode for reporting uplink control information for the first set of component carriers and the second set of component carriers; and transmitting third uplink control information for the first set of component carriers using second uplink control resources of the first serving cell and fourth uplink control information for the second set of component carriers using third uplink control resources of the second serving cell based at least in part on the different mode.

Aspect 17: The method of any of aspects 1 through 16, wherein uplink control information comprises a hybrid automatic repeat request codebook, a channel state information report, a scheduling request, or any combination thereof.

Aspect 18: A method for wireless communications at a base station, comprising: activating a first set of component carriers that is associated with a first group of serving cells and a second set of component carriers that is associated with a second group of serving cells; configuring a first serving cell of the first group of serving cells with uplink control resources for reporting uplink control information for the first set of component carriers; configuring a second serving cell of the second group of serving cells with uplink control resources for reporting uplink control information for the second set of component carriers based at least in part on the activating; selecting a mode for reporting uplink control information for the first set of component carriers and the second set of component carriers based at least in part on the first serving cell and the second serving cell; and receiving first uplink control information for the first set of component carriers and second uplink control information for the second set of component carriers using the uplink control resources of the first serving cell based at least in part on the selecting.

Aspect 19: The method of aspect 18, further comprising: determining that uplink control information for the first set of component carriers and that uplink control information for the second set of component carriers is to be reported using uplink control resources of the first serving cell, wherein the mode for reporting uplink control information is selected based at least in part on the determining.

Aspect 20: The method of aspect 19, wherein the determining is based at least in part on a measurement of first channel conditions for the first serving cell and of second channel conditions for the second serving cell; a calculation of transmission power for simultaneously transmitting uplink control information over both the first serving cell and the second serving cell; a first priority of the first uplink control information and a second priority of the second uplink control information; a first payload size of the first uplink control information and a second payload size of the second uplink control information; a first code rate of the first uplink control information and a second code rate of the second uplink control information; an overlap in time of uplink control resources of the first serving cell with uplink control resources of the second serving cell; a scheduling of uplink data resources on the second serving cell; or any combination thereof.

Aspect 21: The method of any of aspects 18 through 20, further comprising: transmitting, to a user equipment, control signaling indicating the mode for reporting uplink control information, wherein the control signaling comprises a radio resource control message, a downlink control information message, a medium access control-control element, or any combination thereof.

Aspect 22: The method of any of aspects 18 through 21, further comprising: scheduling the uplink control resources of the first serving cell based at least in part on the selected mode.

Aspect 23: The method of any of aspects 18 through 22, wherein the received first uplink control information is multiplexed with the received second uplink control information.

Aspect 24: A method for wireless communications at a UE, comprising: receiving a first communication from a first transmission point and a second communication from a second transmission point; identifying a first serving cell of a first group of serving cells as being configured with uplink control resources for reporting uplink control information for the first transmission point; identifying a second serving cell of a second group of serving cells as being configured with uplink control resources for reporting uplink control information for the second transmission point; determining that uplink control information for the first transmission point and uplink control information for the second transmission point is to be reported on the first serving cell based at least in part on the first serving cell and the second serving cell; and transmitting first uplink control information for the first transmission point and second uplink control information for the second transmission point using the uplink control resources of the first serving cell based at least in part on the selecting.

Aspect 25: The method of aspect 24, further comprising: receiving a first set of communications from the first transmission point and a second set of communications from the second transmission point; and generating, based at least in part on the first set of communications and the second set of communications, the first uplink control information for the first transmission point and the second uplink control information for the second transmission point, the second uplink control information being generated separately from the first uplink control information.

Aspect 26: The method of any of aspects 24 through 25, further comprising: receiving a first set of downlink control information messages from the first transmission point and a second set of downlink control information messages from the second transmission point; and identifying a location of the uplink control resources based at least in part on the first set of downlink control information messages and the second set of downlink control information messages.

Aspect 27: The method of any of aspects 24 through 26, further comprising: multiplexing the first uplink control information from the first transmission point with the second uplink control information for the second transmission point based at least in part on the selected mode.

Aspect 28: The method of any of aspects 24 through 27, further comprising: selecting a mode for reporting uplink control information for the first transmission point and the second transmission point based at least in part on the determining.

Aspect 29: The method of aspect 28, further comprising: receiving, from a base station, control signaling indicating that uplink control information for the first transmission point and that uplink control information for the second transmission point is to be reported using uplink control resources of the first serving cell, wherein the mode for reporting uplink control information is selected based at least in part on the received control signaling.

Aspect 30: The method of any of aspects 28 through 29, further comprising: determining that uplink control information for the first transmission point and that uplink control information for the second transmission point is to be reported using uplink control resources of the first serving cell, wherein the mode for reporting uplink control information is selected based at least in part on the received control signaling.

Aspect 31: The method of aspect 30, wherein the determining is based at least in part on a scheduling of uplink data resources for the first transmission point or the second transmission point on the second serving cell; an overlap in time of uplink control resources of the first serving cell with uplink control resources of the second serving cell; or any combination thereof.

Aspect 32: An apparatus for wireless communications at a UE comprising a processor and memory coupled to the processor, the processor and memory configured to perform a method of any of aspects 1 through 17.

Aspect 33: An apparatus for wireless communications at a UE comprising at least one means for performing a method of any of aspects 1 through 17.

Aspect 34: A non-transitory computer-readable medium storing code for wireless communications at a UE the code comprising instructions executable by a processor to perform a method of any of aspects 1 through 17.

Aspect 35: An apparatus for wireless communications at a base station comprising a processor and memory coupled to the processor, the processor and memory configured to perform a method of any of aspects 18 through 23.

Aspect 36: An apparatus for wireless communications at a base station comprising at least one means for performing a method of any of aspects 18 through 23.

Aspect 37: A non-transitory computer-readable medium storing code for wireless communications at a base station the code comprising instructions executable by a processor to perform a method of any of aspects 18 through 23.

Aspect 38: An apparatus for wireless communications at a UE comprising a processor and memory coupled to the processor, the processor and memory configured to perform a method of any of aspects 24 through 31.

Aspect 39: An apparatus for wireless communications at a UE comprising at least one means for performing a method of any of aspects 24 through 31.

Aspect 40: A non-transitory computer-readable medium storing code for wireless communications at a UE the code comprising instructions executable by a processor to perform a method of any of aspects 24 through 31.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   identifying a first set of component carriers associated with a first group of serving cells and a second set of component carriers associated with a second group of serving cells;
   identifying a first serving cell of the first group of serving cells as being configured with uplink control resources for reporting uplink control information for the first set of component carriers;
   identifying a second serving cell of the second group of serving cells as being configured with uplink control resources for reporting uplink control information for the second set of component carriers based at least in part on the identified first set of component carriers and the second set of component carriers;
   selecting a mode for reporting uplink control information for the first set of component carriers and the second set of component carriers based at least in part on the first serving cell and the second serving cell; and
   transmitting first uplink control information for the first set of component carriers and second uplink control information for the second set of component carriers using first uplink control resources of the first serving cell based at least in part on the selected mode.

2. The method of claim 1, further comprising:
   selecting, before selecting the mode for reporting, a different mode for reporting uplink control information for the first set of component carriers and the second set of component carriers based at least in part on the first serving cell and the second serving cell;
   transmitting third uplink control information for the first set of component carriers using second uplink control resources of the first serving cell and fourth uplink control information for the second set of component carriers using third uplink control resources of the second serving cell based at least in part on the selected different mode; and
   switching from the selected different mode to the selected mode after transmitting the third uplink control information and the fourth uplink control information.

3. The method of claim 1, further comprising:
   receiving a first set of communications over the first set of component carriers and a second set of communications over the second set of component carriers; and
   generating, based at least in part on the first set of communications and the second set of communications, the first uplink control information for the first set of component carriers and the second uplink control information for the second set of component carriers, the second uplink control information being generated separately from the first uplink control information.

4. The method of claim 1, further comprising:
   receiving a first set of downlink control information messages over the first set of component carriers and a second set of downlink control information messages over the second set of component carriers; and
   identifying a location of the first uplink control resources based at least in part on the first set of downlink control information messages and the second set of downlink control information messages.

5. The method of claim 4, wherein the location of the first uplink control resources is identified relative to a last received downlink control information message of the received first set of downlink control information messages and the received second set of downlink control information messages that is received.

6. The method of claim 4, wherein the location of the first uplink control resources is identified relative to a last received first downlink control information message of the received first set of downlink control information messages and a last received second downlink control information message of the received second set of downlink control information messages that is received, wherein the first uplink control resources comprise a first set of uplink control resources for the first set of component carriers and a second set of uplink control resources for the second set of component carriers that are non-overlapping in time with the first set of uplink control resources.

7. The method of claim 1, further comprising:
   multiplexing the first uplink control information for the first set of component carriers with the second uplink control information for the second set of component carriers based at least in part on the selected mode.

8. The method of claim 1, further comprising:
   receiving, from a network entity, control signaling indicating that uplink control information for the first set of component carriers and that uplink control information for the second set of component carriers is to be reported using uplink control resources of the first serving cell, wherein the mode for reporting uplink control information is selected based at least in part on the received control signaling.

9. The method of claim 8, wherein the control signaling comprises:
   a radio resource control message for configuring the mode for reporting uplink control information;
   a downlink control information message comprising an indication first activating the mode for reporting uplink control information;
   a medium access control-control element that activate the mode for reporting uplink control information; or
   any combination thereof.

10. The method of claim 8, further comprising:
    determining that uplink control information for the first set of component carriers and that uplink control information for the second set of component carriers is to be reported using uplink control resources of the first serving cell, wherein the mode for reporting uplink control information is selected based at least in part on the received control signaling.

11. The method of claim 10, wherein the determining is based at least in part on:
a first priority of the first uplink control information and a second priority of the second uplink control information;
a first payload size of the first uplink control information and a second payload size of the second uplink control information;
a first code rate of the first uplink control information and a second code rate of the second uplink control information; or
any combination thereof.

12. The method of claim 10, wherein the determining is based at least in part on:
a measurement of first channel conditions for the first serving cell and of second channel conditions for the second serving cell;
a calculation of transmission power for simultaneously transmitting uplink control information over both the first serving cell and the second serving cell; or
any combination thereof.

13. The method of claim 10, wherein the determining is based at least in part on:
an overlap in time of uplink control resources of the first serving cell with uplink control resources of the second serving cell;
a scheduling of uplink data resources on the second serving cell; or
any combination thereof.

14. The method of claim 13, wherein the determining is based at least in part on the uplink data resources of the first serving cell overlapping in time with the uplink control resources of the second serving cell.

15. The method of claim 1, further comprising:
transmitting, to a network entity, an indication of the selected mode.

16. The method of claim 1, further comprising:
selecting, after transmitting the first uplink control information and the second uplink control information, a different mode for reporting uplink control information for the first set of component carriers and the second set of component carriers; and
transmitting third uplink control information for the first set of component carriers using second uplink control resources of the first serving cell and fourth uplink control information for the second set of component carriers using third uplink control resources of the second serving cell based at least in part on the selected different mode.

17. The method of claim 1, wherein uplink control information comprises a hybrid automatic repeat request codebook, a channel state information report, a scheduling request, or any combination thereof.

18. A method for wireless communications at a network entity, comprising:
activating a first set of component carriers that is associated with a first group of serving cells and a second set of component carriers that is associated with a second group of serving cells;
configuring a first serving cell of the first group of serving cells with uplink control resources for reporting uplink control information for the first set of component carriers;
configuring a second serving cell of the second group of serving cells with uplink control resources for reporting uplink control information for the second set of component carriers based at least in part on the activating;
selecting a mode for reporting uplink control information for the first set of component carriers and the second set of component carriers based at least in part on the first serving cell and the second serving cell; and
receiving first uplink control information for the first set of component carriers and second uplink control information for the second set of component carriers using the uplink control resources of the first serving cell based at least in part on the selecting.

19. The method of claim 18, further comprising:
determining that uplink control information for the first set of component carriers and that uplink control information for the second set of component carriers is to be reported using uplink control resources of the first serving cell, wherein the mode for reporting uplink control information is selected based at least in part on the determining.

20. The method of claim 19, wherein the determining is based at least in part on:
a measurement of first channel conditions for the first serving cell and of second channel conditions for the second serving cell;
a calculation of transmission power for simultaneously transmitting uplink control information over both the first serving cell and the second serving cell;
a first priority of the first uplink control information and a second priority of the second uplink control information;
a first payload size of the first uplink control information and a second payload size of the second uplink control information;
a first code rate of the first uplink control information and a second code rate of the second uplink control information;
an overlap in time of uplink control resources of the first serving cell with uplink control resources of the second serving cell;
a scheduling of uplink data resources on the second serving cell; or
any combination thereof.

21. The method of claim 18, further comprising:
transmitting, to a user equipment, control signaling indicating the mode for reporting uplink control information, wherein the control signaling comprises a radio resource control message, a downlink control information message, a medium access control-control element, or any combination thereof.

22. The method of claim 18, further comprising:
scheduling the uplink control resources of the first serving cell based at least in part on the selected mode.

23. The method of claim 18, wherein the received first uplink control information is multiplexed with the received second uplink control information.

24. An apparatus for wireless communications at a user equipment (UE), comprising:
a processor,
memory coupled with the processor; and
instructions stored in the memory and executable by the processor to cause the apparatus to:
identify a first set of component carriers associated with a first group of serving cells and a second set of component carriers associated with a second group of serving cells;
identify a first serving cell of the first group of serving cells as being configured with uplink control resources for reporting uplink control information for the first set of component carriers;

identify a second serving cell of the second group of serving cells as being configured with uplink control resources for reporting uplink control information for the second set of component carriers based at least in part on the identified first set of component carriers and the second set of component carriers;

select a mode for reporting uplink control information for the first set of component carriers and the second set of component carriers based at least in part on the first serving cell and the second serving cell; and transmit first uplink control information for the first set of component carriers and second uplink control information for the second set of component carriers using first uplink control resources of the first serving cell based at least in part on the selected mode.

25. The apparatus of claim 24, wherein the instructions are further executable by the processor to cause the apparatus to:

select, before selecting the mode for reporting, a different mode for reporting uplink control information for the first set of component carriers and the second set of component carriers based at least in part on the first serving cell and the second serving cell;

transmit third uplink control information for the first set of component carriers using second uplink control resources of the first serving cell and fourth uplink control information for the second set of component carriers using third uplink control resources of the second serving cell based at least in part on the selected different mode; and switch from the selected different mode to the selected mode after transmitting the third uplink control information and the fourth uplink control information.

26. The apparatus of claim 24, wherein the instructions are further executable by the processor to cause the apparatus to:

receive a first set of communications over the first set of component carriers and a second set of communications over the second set of component carriers; and generate, based at least in part on the first set of communications and the second set of communications, the first uplink control information for the first set of component carriers and the second uplink control information for the second set of component carriers, the second uplink control information being generated separately from the first uplink control information.

27. The apparatus of claim 24, wherein the instructions are further executable by the processor to cause the apparatus to:

receive a first set of downlink control information messages over the first set of component carriers and a second set of downlink control information messages over the second set of component carriers; and identify a location of the first uplink control resources based at least in part on the first set of downlink control information messages and the second set of downlink control information messages.

28. The apparatus of claim 24, wherein the instructions are further executable by the processor to cause the apparatus to:

multiplex the first uplink control information for the first set of component carriers with the second uplink control information for the second set of component carriers based at least in part on the selected mode.

29. The apparatus of claim 24, wherein the instructions are further executable by the processor to cause the apparatus to:

receive, from a network entity, control signaling indicating that uplink control information for the first set of component carriers and that uplink control information for the second set of component carriers is to be reported using uplink control resources of the first serving cell, wherein the mode for reporting uplink control information is selected based at least in part on the received control signaling.

30. The apparatus of claim 29, wherein the instructions are further executable by the processor to cause the apparatus to:

determine that uplink control information for the first set of component carriers and that uplink control information for the second set of component carriers is to be reported using uplink control resources of the first serving cell, wherein the mode for reporting uplink control information is selected based at least in part on the received control signaling.

31. The apparatus of claim 24, wherein the instructions are further executable by the processor to cause the apparatus to:

transmit, to a network entity, an indication of the selected mode.

32. The apparatus of claim 24, wherein the instructions are further executable by the processor to cause the apparatus to:

select, after transmitting the first uplink control information and the second uplink control information, a different mode for reporting uplink control information for the first set of component carriers and the second set of component carriers; and transmit third uplink control information for the first set of component carriers using second uplink control resources of the first serving cell and fourth uplink control information for the second set of component carriers using third uplink control resources of the second serving cell based at least in part on the selected different mode.

33. An apparatus for wireless communications at a network entity, comprising:

a processor, memory coupled with the processor; and instructions stored in the memory and executable by the processor to cause the apparatus to:

activate a first set of component carriers that is associated with a first group of serving cells and a second set of component carriers that is associated with a second group of serving cells;

configure a first serving cell of the first group of serving cells with uplink control resources for reporting uplink control information for the first set of component carriers;

configure a second serving cell of the second group of serving cells with uplink control resources for reporting uplink control information for the second set of component carriers based at least in part on the activating;

select a mode for reporting uplink control information for the first set of component carriers and the second set of component carriers based at least in part on the first serving cell and the second serving cell; and receive first uplink control information for the first set of component carriers and second uplink control information for the second set of component carriers using the uplink control resources of the first serving cell based at least in part on the selecting.

34. The apparatus of claim 33, wherein the instructions are further executable by the processor to cause the apparatus to:
determine that uplink control information for the first set of component carriers and that uplink control information for the second set of component carriers is to be reported using uplink control resources of the first serving cell, wherein the mode for reporting uplink control information is selected based at least in part on the determining.

35. The apparatus of claim 33, wherein the instructions are further executable by the processor to cause the apparatus to:
transmit, to a user equipment, control signaling indicating the mode for reporting uplink control information, wherein the control signaling comprises a radio resource control message, a downlink control information message, a medium access control-control element, or any combination thereof.

36. The apparatus of claim 33, wherein the instructions are further executable by the processor to cause the apparatus to:
schedule the uplink control resources of the first serving cell based at least in part on the selected mode.

37. An apparatus for wireless communications at a user equipment (UE), comprising:
means for identifying a first set of component carriers associated with a first group of serving cells and a second set of component carriers associated with a second group of serving cells;
means for identifying a first serving cell of the first group of serving cells as being configured with uplink control resources for reporting uplink control information for the first set of component carriers;
means for identifying a second serving cell of the second group of serving cells as being configured with uplink control resources for reporting uplink control information for the second set of component carriers based at least in part on the identified first set of component carriers and the second set of component carriers;
means for selecting a mode for reporting uplink control information for the first set of component carriers and the second set of component carriers based at least in part on the first serving cell and the second serving cell; and
means for transmitting first uplink control information for the first set of component carriers and second uplink control information for the second set of component carriers using first uplink control resources of the first serving cell based at least in part on the selected mode.

38. The apparatus of claim 37, further comprising:
means for selecting, before selecting the mode for reporting, a different mode for reporting uplink control information for the first set of component carriers and the second set of component carriers based at least in part on the first serving cell and the second serving cell;
means for transmitting third uplink control information for the first set of component carriers using second uplink control resources of the first serving cell and fourth uplink control information for the second set of component carriers using third uplink control resources of the second serving cell based at least in part on the selected different mode; and
means for switching from the selected different mode to the selected mode after transmitting the third uplink control information and the fourth uplink control information.

39. The apparatus of claim 37, further comprising:
means for receiving a first set of communications over the first set of component carriers and a second set of communications over the second set of component carriers; and
means for generating, based at least in part on the first set of communications and the second set of communications, the first uplink control information for the first set of component carriers and the second uplink control information for the second set of component carriers, the second uplink control information being generated separately from the first uplink control information.

40. The apparatus of claim 37, further comprising:
means for receiving a first set of downlink control information messages over the first set of component carriers and a second set of downlink control information messages over the second set of component carriers; and
means for identifying a location of the first uplink control resources based at least in part on the first set of downlink control information messages and the second set of downlink control information messages.

41. The apparatus of claim 37, further comprising:
means for multiplexing the first uplink control information for the first set of component carriers with the second uplink control information for the second set of component carriers based at least in part on the selected mode.

42. The apparatus of claim 37, further comprising:
means for receiving, from a network entity, control signaling indicating that uplink control information for the first set of component carriers and that uplink control information for the second set of component carriers is to be reported using uplink control resources of the first serving cell, wherein the mode for reporting uplink control information is selected based at least in part on the received control signaling.

43. The apparatus of claim 42, further comprising:
means for determining that uplink control information for the first set of component carriers and that uplink control information for the second set of component carriers is to be reported using uplink control resources of the first serving cell, wherein the mode for reporting uplink control information is selected based at least in part on the received control signaling.

44. An apparatus for wireless communications at a network entity, comprising:
means for activating a first set of component carriers that is associated with a first group of serving cells and a second set of component carriers that is associated with a second group of serving cells;
means for configuring a first serving cell of the first group of serving cells with uplink control resources for reporting uplink control information for the first set of component carriers;
means for configuring a second serving cell of the second group of serving cells with uplink control resources for reporting uplink control information for the second set of component carriers based at least in part on the activating;
means for selecting a mode for reporting uplink control information for the first set of component carriers and the second set of component carriers based at least in part on the first serving cell and the second serving cell; and means for receiving first uplink control information for the first set of component carriers and second uplink control information for the second set of component carriers using the uplink control resources of the first serving cell based at least in part on the selecting.

45. The apparatus of claim 44, further comprising:
means for determining that uplink control information for the first set of component carriers and that uplink control information for the second set of component carriers is to be reported using uplink control resources of the first serving cell, wherein the mode for reporting uplink control information is selected based at least in part on the determining.

46. The apparatus of claim 44, further comprising:
means for transmitting, to a user equipment, control signaling indicating the mode for reporting uplink control information, wherein the control signaling comprises a radio resource control message, a downlink control information message, a medium access control-control element, or any combination thereof.

47. The apparatus of claim 44, further comprising:
means for scheduling the uplink control resources of the first serving cell based at least in part on the selected mode.

48. A non-transitory computer-readable medium storing code for wireless communications at a user equipment (UE), the code comprising instructions executable by a processor to:
identify a first set of component carriers associated with a first group of serving cells and a second set of component carriers associated with a second group of serving cells;
identify a first serving cell of the first group of serving cells as being configured with uplink control resources for reporting uplink control information for the first set of component carriers;
identify a second serving cell of the second group of serving cells as being configured with uplink control resources for reporting uplink control information for the second set of component carriers based at least in part on the identified first set of component carriers and the second set of component carriers;
select a mode for reporting uplink control information for the first set of component carriers and the second set of component carriers based at least in part on the first serving cell and the second serving cell; and
transmit first uplink control information for the first set of component carriers and second uplink control information for the second set of component carriers using first uplink control resources of the first serving cell based at least in part on the selected mode.

49. The non-transitory computer-readable medium of claim 48, wherein the instructions are further executable by the processor to:
select, before selecting the mode for reporting, a different mode for reporting uplink control information for the first set of component carriers and the second set of component carriers based at least in part on the first serving cell and the second serving cell;
transmit third uplink control information for the first set of component carriers using second uplink control resources of the first serving cell and fourth uplink control information for the second set of component carriers using third uplink control resources of the second serving cell based at least in part on the selected different mode; and
switch from the selected different mode to the selected mode after transmitting the third uplink control information and the fourth uplink control information.

50. The non-transitory computer-readable medium of claim 48, wherein the instructions are further executable by the processor to:
receive a first set of communications over the first set of component carriers and a second set of communications over the second set of component carriers; and
generate, based at least in part on the first set of communications and the second set of communications, the first uplink control information for the first set of component carriers and the second uplink control information for the second set of component carriers, the second uplink control information being generated separately from the first uplink control information.

51. The non-transitory computer-readable medium of claim 48, wherein the instructions are further executable by the processor to:
receive a first set of downlink control information messages over the first set of component carriers and a second set of downlink control information messages over the second set of component carriers; and
identify a location of the first uplink control resources based at least in part on the first set of downlink control information messages and the second set of downlink control information messages.

52. The non-transitory computer-readable medium of claim 48, wherein the instructions are further executable by the processor to:
multiplex the first uplink control information for the first set of component carriers with the second uplink control information for the second set of component carriers based at least in part on the selected mode.

53. The non-transitory computer-readable medium of claim 48, wherein the instructions are further executable by the processor to:
receive, from a network entity, control signaling indicating that uplink control information for the first set of component carriers and that uplink control information for the second set of component carriers is to be reported using uplink control resources of the first serving cell, wherein the mode for reporting uplink control information is selected based at least in part on the received control signaling.

54. A non-transitory computer-readable medium storing code for wireless communications at a network entity, the code comprising instructions executable by a processor to:
activate a first set of component carriers that is associated with a first group of serving cells and a second set of component carriers that is associated with a second group of serving cells;
configure a first serving cell of the first group of serving cells with uplink control resources for reporting uplink control information for the first set of component carriers;
configure a second serving cell of the second group of serving cells with uplink control resources for reporting uplink control information for the second set of component carriers based at least in part on the activating;
select a mode for reporting uplink control information for the first set of component carriers and the second set of component carriers based at least in part on the first serving cell and the second serving cell; and receive first uplink control information for the first set of component carriers and second uplink control information for the second set of component carriers using the uplink control resources of the first serving cell based at least in part on the selecting.

55. The non-transitory computer-readable medium of claim 54, wherein the instructions are further executable by the processor to:
determine that uplink control information for the first set of component carriers and that uplink control information for the second set of component carriers is to be reported using uplink control resources of the first serving cell, wherein the mode for reporting uplink control information is selected based at least in part on the determining.

56. The non-transitory computer-readable medium of claim 54, wherein the instructions are further executable by the processor to:
transmit, to a user equipment, control signaling indicating the mode for reporting uplink control information, wherein the control signaling comprises a radio resource control message, a downlink control information message, a medium access control-control element, or any combination thereof.

57. The non-transitory computer-readable medium of claim 54, wherein the instructions are further executable by the processor to:
schedule the uplink control resources of the first serving cell based at least in part on the selected mode.

* * * * *